US011428801B2

(12) United States Patent
Jeon et al.

(10) Patent No.: US 11,428,801 B2
(45) Date of Patent: Aug. 30, 2022

(54) MOVING DEVICE AND OBJECT DETECTION METHOD THEREOF

(71) Applicant: Samsung Electronics Co., Ltd., Suwon-si (KR)

(72) Inventors: Taehan Jeon, Suwon-si (KR); Changwon Son, Suwon-si (KR); Kyuyoun Hwang, Suwon-si (KR); Dongwook Kwon, Suwon-si (KR); Inhak Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 16/690,486

(22) Filed: Nov. 21, 2019

(65) Prior Publication Data

US 2020/0158857 A1 May 21, 2020

(30) Foreign Application Priority Data

Nov. 21, 2018 (KR) .................. 10-2018-0144677

(51) Int. Cl.
*G01S 13/88* (2006.01)
*A47L 11/24* (2006.01)
(Continued)

(52) U.S. Cl.
CPC ............ *G01S 13/885* (2013.01); *A47L 11/24* (2013.01); *A47L 11/4011* (2013.01);
(Continued)

(58) Field of Classification Search
CPC ...... G01S 13/885; G01S 13/89; G01S 13/865; G01S 13/867; G01S 13/87; G01S 13/881;
(Continued)

(56) References Cited

U.S. PATENT DOCUMENTS 5,673,050 A * 9/1997 Moussally .......... G01S 13/0209
342/25 F
8,797,828 B1 8/2014 Lev et al.
(Continued)

FOREIGN PATENT DOCUMENTS

DE 10 2011 120 153 A1 6/2013
JP 2017-501473 A 1/2017
(Continued)

OTHER PUBLICATIONS

International Search Report dated Mar. 3, 2020, issued in International Patent Application No. PCT/KR2019/016054.
(Continued)

*Primary Examiner* — Timothy A Brainard
(74) *Attorney, Agent, or Firm* — Jefferson IP Law, LLP

(57) ABSTRACT

A moving device and an object detection method thereof are provided. A method, performed by a moving device, of generating a map related to an object in a task space includes radiating at least one sensing signal toward aboveground and underground regions in a vicinity of the moving device, receiving signals reflected from an aboveground object located on a ground in the task space and an underground object located under the ground in the task space, and generating the map indicating distribution of the aboveground object and distribution of the underground object, based on the received reflected signals.

15 Claims, 22 Drawing Sheets

(51) Int. Cl.
*G01S 13/89* (2006.01)
*A47L 11/40* (2006.01)

(52) U.S. Cl.
CPC ......... *G01S 13/89* (2013.01); *A47L 2201/022* (2013.01); *A47L 2201/06* (2013.01)

(58) Field of Classification Search
CPC ................... G01S 13/931; G01S 17/89; G01S 2013/9327; G01S 7/417; A47L 11/24; A47L 11/4011; A47L 2201/022; A47L 2201/04; A47L 2201/06; A47L 7/0085; A47L 9/2805; G05D 1/0257; G05D 1/0274; G05D 2201/0203
See application file for complete search history.

(56) References Cited

U.S. PATENT DOCUMENTS

| | | | |
|---|---|---|---|
| 9,915,727 B1* | 3/2018 | Reznack | G01S 13/34 |
| 10,209,080 B2 | 2/2019 | Lindhe et al. | |
| 10,677,820 B2* | 6/2020 | Olsson | G01R 19/00 |
| 2012/0249356 A1* | 10/2012 | Shope | G01S 13/04 |
| | | | 342/22 |
| 2014/0121964 A1 | 5/2014 | Stanley et al. | |
| 2014/0125457 A1 | 5/2014 | Rushing | |
| 2015/0045990 A1 | 2/2015 | Shih et al. | |
| 2015/0356341 A1* | 12/2015 | Eccles | G06V 20/13 |
| | | | 382/224 |
| 2016/0097879 A1 | 4/2016 | Stolarczyk et al. | |
| 2016/0274580 A1 | 9/2016 | Jung et al. | |
| 2016/0306063 A1* | 10/2016 | Hyde | G01S 13/885 |
| 2017/0325647 A1 | 11/2017 | Kwak | |
| 2018/0196135 A1 | 7/2018 | Crain et al. | |
| 2019/0155276 A1 | 5/2019 | Jung et al. | |

FOREIGN PATENT DOCUMENTS

| | | |
|---|---|---|
| KR | 10-0266984 B1 | 10/2000 |
| KR | 10-0725516 B1 | 6/2007 |
| KR | 10-2008-0061416 A | 7/2008 |
| KR | 10-2015-0047899 A | 5/2015 |
| WO | 2015/090397 A1 | 6/2015 |

OTHER PUBLICATIONS

European Search Report dated Aug. 13, 2021; European Appln. No. 19886400.1-1206 / 3818423 PCT/KR2019016054.

* cited by examiner

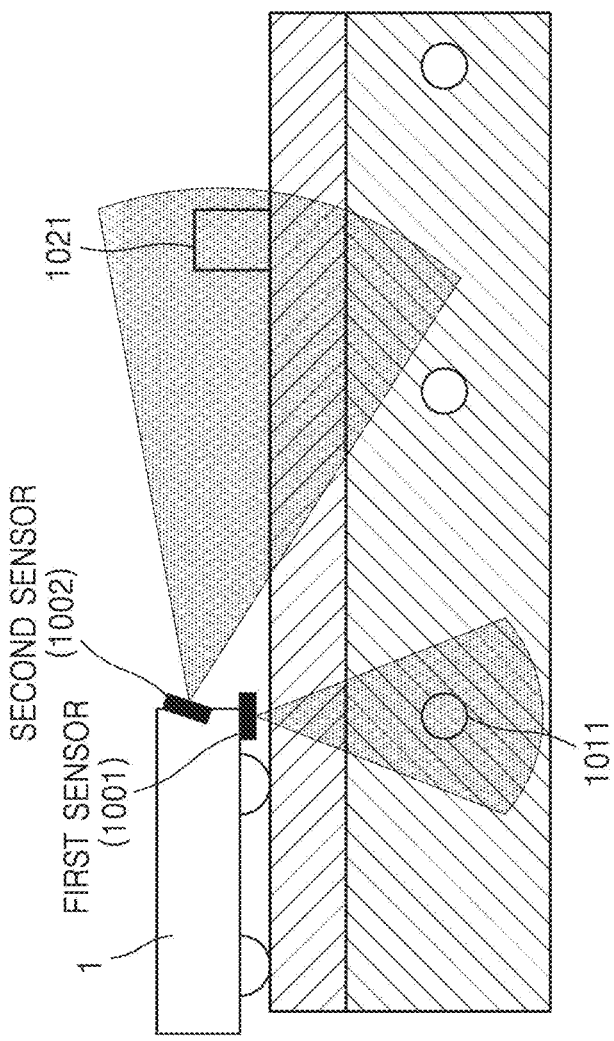
FIG. 10A
FIG. 10B
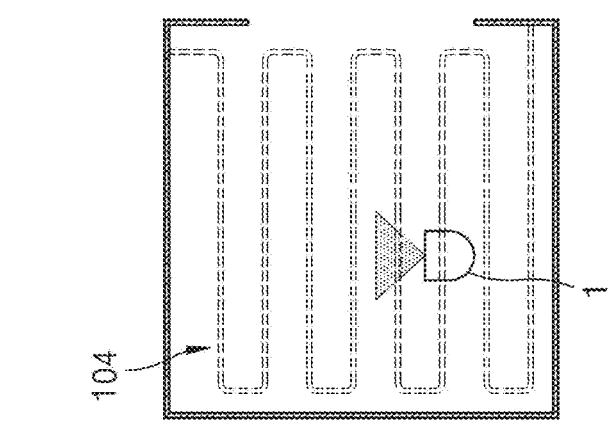
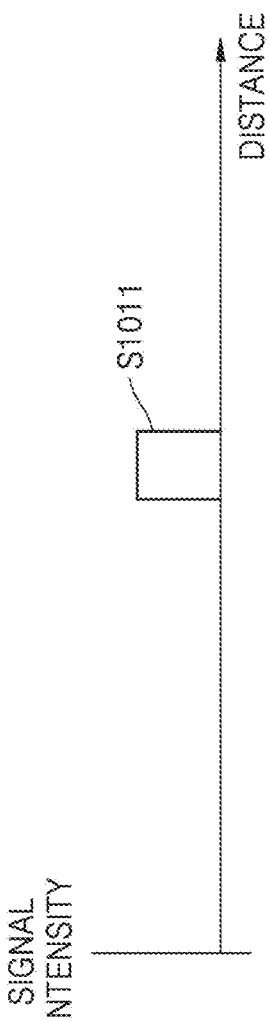
FIG. 10C

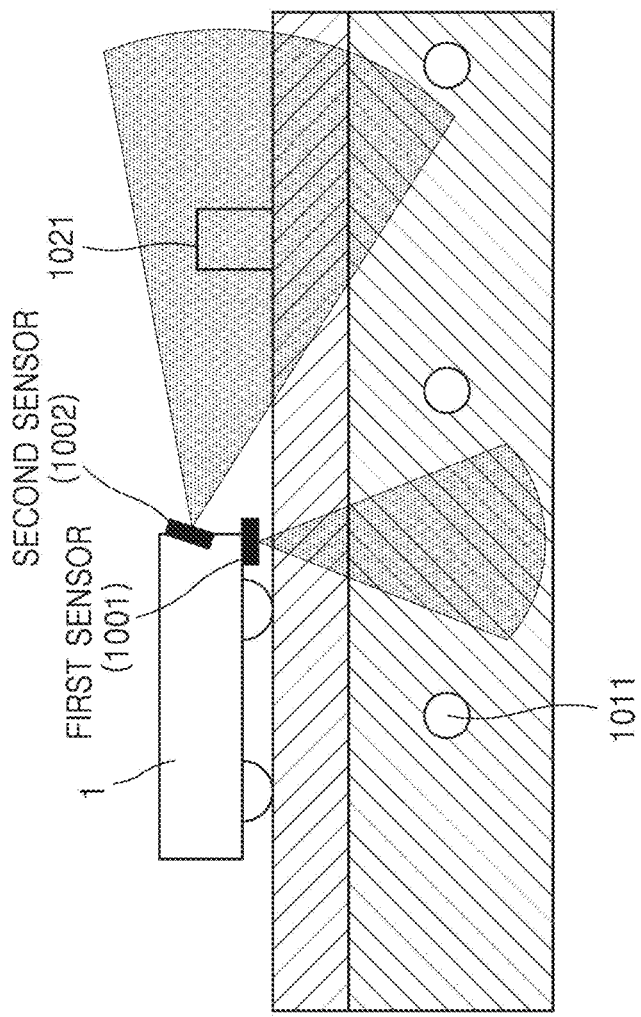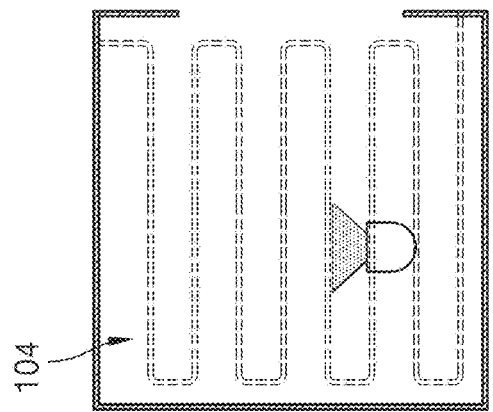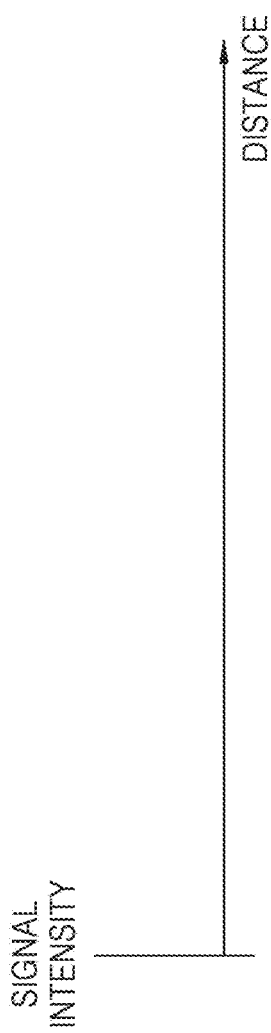

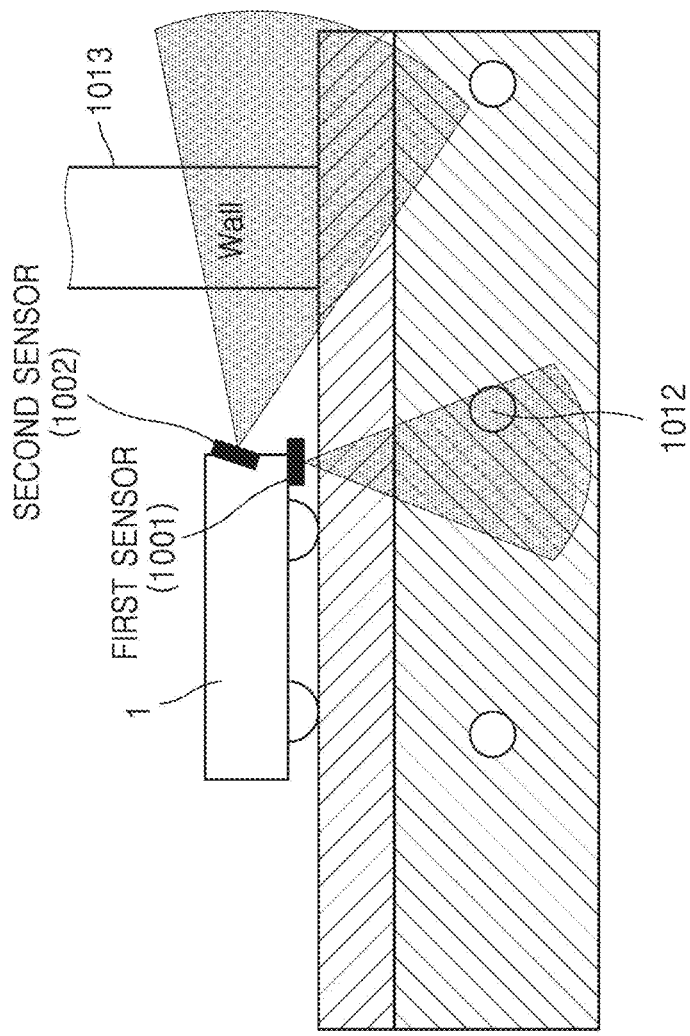
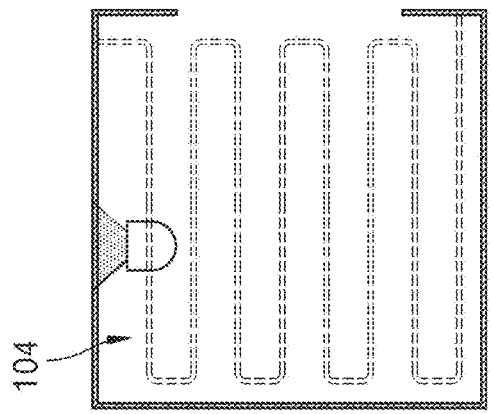
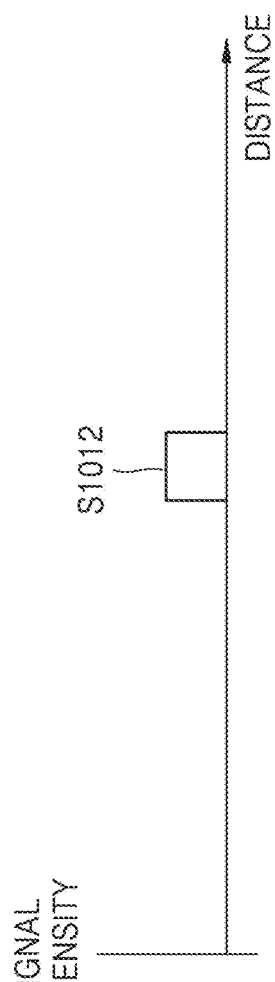

FIG. 20
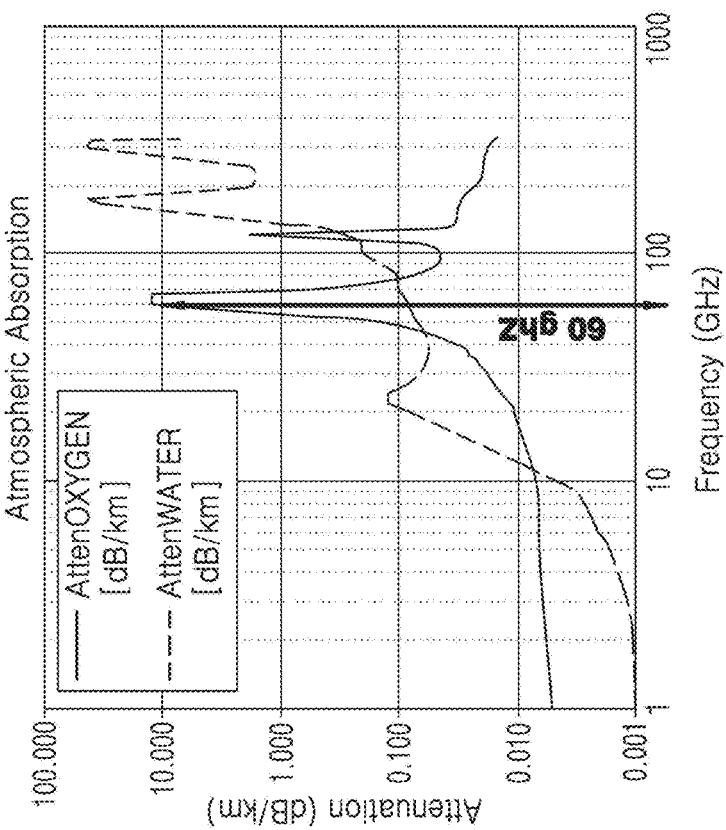
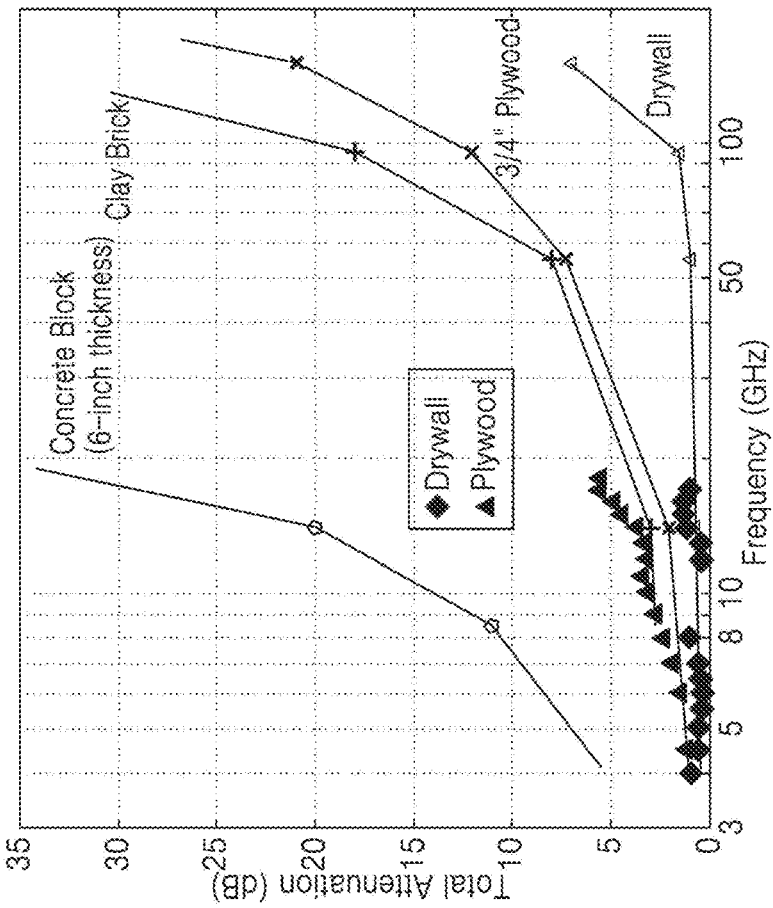

MOVING DEVICE AND OBJECT DETECTION METHOD THEREOF

CROSS-REFERENCE TO RELATED APPLICATION(S)

This application is based on and claims priority under 35 U.S.C. § 119(a) of a Korean patent application number 10-2018-0144677, filed on Nov. 21, 2018, in the Korean Intellectual Property Office, the disclosure of which is incorporated by reference herein in its entirety.

BACKGROUND

1. Field

The disclosure relates to a moving device. More particularly, the disclosure relates to a moving device for detecting aboveground and underground objects of a task space.

2. Description of the Related Art

A moving device is a device for autonomously moving and performing a task. In particular, as an example of the moving device, a robotic cleaner is a device capable of automatically cleaning a cleaning region by sucking up foreign substances such as dust on the floor while traveling in the cleaning space without manipulation by a user.

While the robotic cleaner is cleaning the cleaning region, obstructions such as furniture, thresholds, and electric cables located on a travel route of the robotic cleaner interfere with movement of the robotic cleaner and thus the robotic cleaner needs to detect and bypass the obstructions. As such, to detect and bypass obstructions, a general robotic cleaner radiates an infrared beam or ultrasonic waves in a forward direction of the robotic cleaner, and detects the presence of an obstruction and a location of the obstruction by using a reflected beam or reflected waves.

However, when using an infrared beam or ultrasonic waves as described above, the accuracy of detecting the presence and location of an obstruction may be reduced due to the influence of a color of the cleaning space, external light such as sunlight, external noise, temperature, etc.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method, performed by a moving device, of detecting aboveground and underground objects of a task space by using a radio-frequency (RF) sensor, and generating a map indicating the aboveground and underground objects.

Another aspect of the disclosure is to provide a method, performed by a moving device, of detecting an object by correcting a signal detected by an RF sensor, and generating a map considering characteristics of the object.

Another aspect of the disclosure is to provide a method, performed by a moving device, of identifying an object in a task space considering a signal reflected from an underground object of the task space, and generating a map considering characteristics of the object.

Additional aspects will be set forth in part in the description which follows and, in part, will be apparent from the description, or may be learned by practice of the presented embodiments.

In accordance with an aspect of the disclosure, a moving device for generating a map related to an object in a task space is provided. The moving device includes a body, a running unit configured to move the body, a sensing circuitry configured to radiate at least one sensing signal toward a region in a vicinity of the moving device, a memory storing at least one instruction, and a processor configured to execute the at least one instruction to control the sensing circuitry to radiate the sensing signal toward aboveground and underground regions in the vicinity of the moving device, and receive signals reflected from an aboveground object located on a ground in the task space and an underground object located under the ground in the task space, and generate the map indicating distribution of the aboveground object and distribution of the underground object, based on the received reflected signals.

In accordance with another aspect of the disclosure, a method, performed by a moving device, of generating a map related to an object in a task space is provided. The method includes radiating at least one sensing signal toward aboveground and underground regions in a vicinity of the moving device, receiving signals reflected from an aboveground object located on a ground in the task space and an underground object located under the ground in the task space, and generating the map indicating distribution of the aboveground object and distribution of the underground object, based on the received reflected signals.

In accordance with another aspect of the disclosure, a computer program product is provided. The computer program product includes a computer-readable recording medium having stored therein a program for executing the above-described method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 10A, 10B, 10C, 11A, 11B, 11C, 12A, 12B and 12C are diagrams for describing operations of a moving device using a plurality of radio-frequency (RF) sensors, according to various embodiments of the disclosure;

FIG. 20 includes graphs respectively showing data about signal attenuation through materials and signal attenuation in the atmosphere, according to an embodiment of the disclosure;

Throughout the drawings, it should be noted that like reference numbers are used to depict the same or similar elements, features, and structures.

DETAILED DESCRIPTION

Figure 1A:
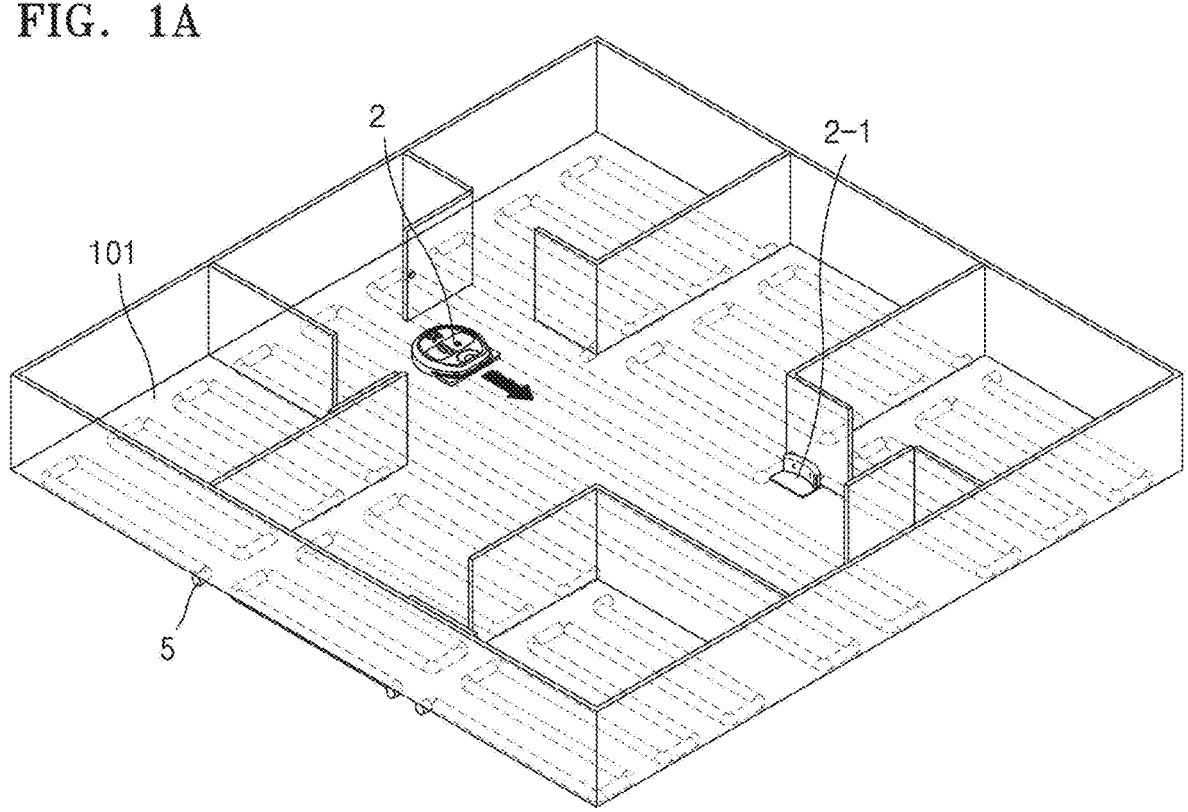
FIGS. 1A and 1B are diagrams illustrating an example of a moving device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

The expressions such as "first", "second", "$1^{st}$", and "$2^{nd}$" used herein may refer to various different elements irrespective of the order and/or priority thereof, and are merely used to distinguish one element from another without limiting the elements. For example, "a first user device" and "a second user device" may indicate different user devices irrespective of the order or priority thereof. Specifically, a first element may be referred to as a second element and, similarly, a second element may be referred to as a first element without departing from the scope of the disclosure.

It will be understood that, when an element (e.g., a first element) is referred to as being "(operatively or communicatively) coupled with/to" or "connected to" another element (e.g., a second element), the element can be coupled or connected to the other element directly or through another element (e.g., a third element). On the contrary, it will be understood that, when an element (e.g., a first element) is referred to as being "directly coupled to" or "directly connected to" another element (e.g., a second element), another element (e.g., a third element) is not present therebetween.

In this specification, an object may indicate an object located at a task space where a moving device moves. The object may include an aboveground object located on the ground in a task space and an underground object located under the ground in the task space. The aboveground object may include an obstruction interfering with movement of the moving device, and a task object corresponding to a task target of the moving device. For example, the obstruction may include a stationary object such as a wall, furniture, or a home appliance fixed in the task space, and a moving object such as a person or an animal capable of autonomously moving, and the task object may include a waste or a pollutant in the task space, but the obstruction and the task object are not limited thereto. The underground object may include, for example, a pipe or a steel-frame located under the ground in the task space. For example, the underground object may include the floor of the task space.

In this specification, a map may refer to a map of the task region. The map may include information about the aboveground object located on the ground in the task region, and the underground object. The map may include structure information indicating an aboveground structure of the task region, aboveground distribution information indicating distribution of the aboveground object located on the ground in the task region, and underground distribution information indicating distribution of the underground object located under the ground in the task region, but is not limited thereto. The map may be implemented as an integrated map of at least two of a structure map indicating an aboveground structure of the task region, an aboveground map indicating distribution of the aboveground object, and an underground map indicating distribution of the underground object. The map may include information indicating characteristics of the aboveground and underground objects of the task space.

Terms and words used in the following description and claims are not limited to the bibliographical meanings, but merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

All terms (including technical and scientific terms) used herein have the same meaning as generally understood by one of ordinary skill in the art. Terms as defined in a commonly used dictionary should be construed as having the same meaning as in an associated technical context, and unless clearly defined herein, the terms are not ideally or excessively construed as having formal meaning. In some cases, even terms defined in this specification cannot be construed to exclude embodiments of the disclosure.

Figure 1B:
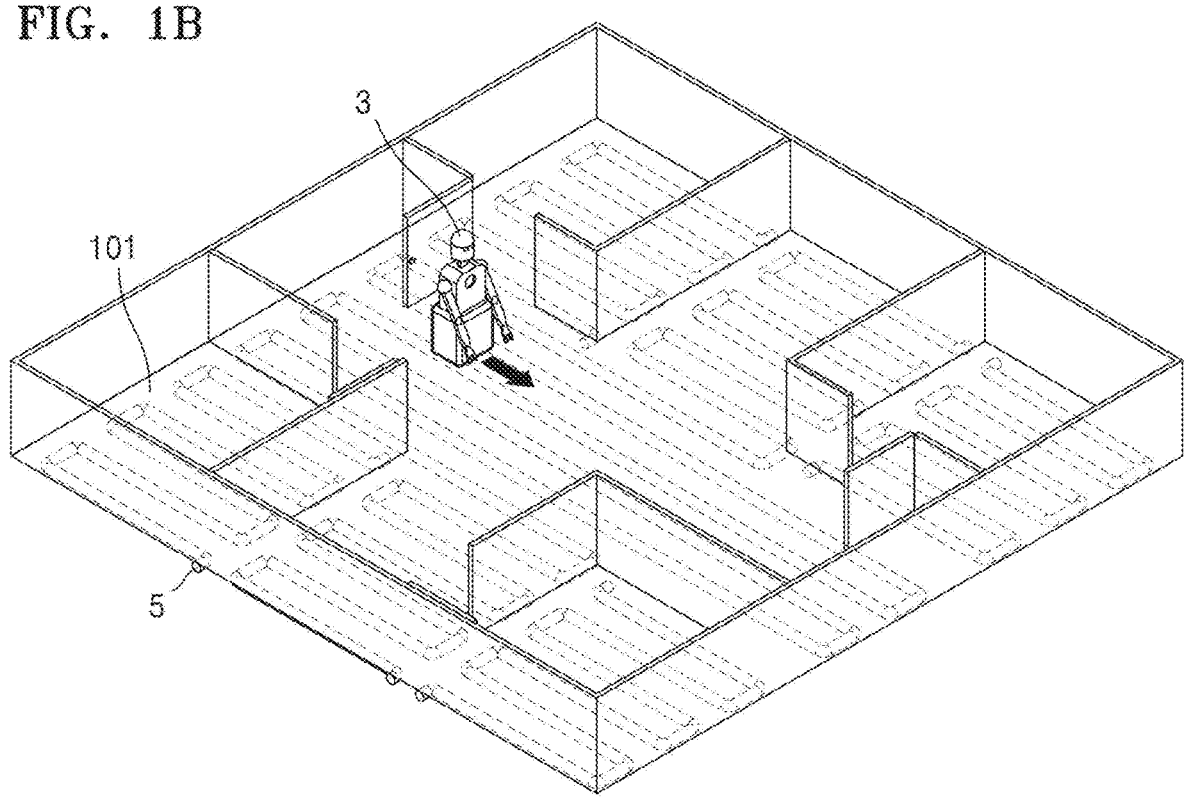

FIGS. 1A and 1B are diagrams illustrating an example of a moving device according to various embodiments of the disclosure.

The moving device 1 may be a robotic cleaner 2 as illustrated in FIG. 1A. Alternatively, the moving device 1 may be a domestic robot 3 as illustrated in FIG. 1B. In addition, the moving device 1 may include various devices such as public service robots, industrial transport robots, worker assistance robots, and autonomous vehicles, but is not limited to the above-mentioned examples.

Referring to FIG. 1A, the robotic cleaner 2 may automatically travel in and clean a region of interest 101 (e.g., the floor in a house). The robotic cleaner 2 may meet an object on the floor while cleaning the floor. The robotic cleaner 2 may recognize the object and bypass or go over the object. A charger 2-1 for charging the robotic cleaner 2 may be provided together with the robotic cleaner 2. The charger 2-1 may include a charging station for charging a battery of the robotic cleaner 2 (hereinafter also referred to as a docking station or a base station).

Referring to FIG. 1B, the domestic robot 3 may move around the region of interest 101 (e.g., the house) and assist housework of a user. For example, the domestic robot 3 may help chores, cleaning, or cooking, or control smart home appliances connected thereto, e.g., a washing machine and a television, in the house. The domestic robot 3 may travel in the house according to autonomous determination, or travel toward a designated direction in response to a call of the user.

According to the disclosure, the moving device 1 such as the robotic cleaner 2 or the domestic robot 3 may detect an object in a task space by using a radio-frequency (RF) sensor. The RF sensor has a variety of advantages compared to sensors commonly used in existing moving devices. For example, a light detection and ranging (LiDAR) sensor may generate a two-dimensional (2D) line and obtain distance information to an object, but may not sense a black color, a transparent color, or metal. As another example, an ultrasonic sensor may sense a black color, a transparent color, or metal, but may have a limited sensing range.

On the contrary, the RF sensor has a high signal transmittance and thus may be excellent in detecting objects. A material (or a medium) of an object may be predicted considering characteristics of a signal measured using the RF sensor. However, due to the high signal transmittance, the RF sensor may detect even unnecessary objects in actual uses.

For example, because an RF signal is radially radiated in a forward direction, a signal detected by the RF sensor may include not only a signal reflected from an aboveground object on the floor but also a signal reflected from an underground object 5 (e.g., a pipe) under the floor. As such, the aboveground object and the underground object 5 need to be identified based on the reflected signal, and the signal detected by the RF sensor needs to be corrected to detect the aboveground object on the floor.

Particularly, because an environment where the moving device 1 travels (specifically, an environment under the floor) differs per a travel region, the signal detected by the RF sensor needs to be corrected considering the signal reflected from the underground object differently provided depending on the travel environment.

The moving device 1 may generate a map indicating distribution of aboveground and underground objects in a task space and perform a task in the task space, by using at least one learning model. Alternatively, the moving device 1 may separately generate an underground map indicating distribution of the underground object in the task space, and an aboveground map indicating distribution of the aboveground object in the task space, by using at least one learning model. The learning model may be constructed considering, for example, an application field of the learning model, a purpose of learning, or computing performance of a device. The learning model may be, for example, a model based on a neural network. For example, the learning model may use a deep neural network (DNN) model, a recurrent neural network (RNN) model, or a bidirectional recurrent deep neural network (BRDNN) model, but is not limited thereto.

Figure 2:
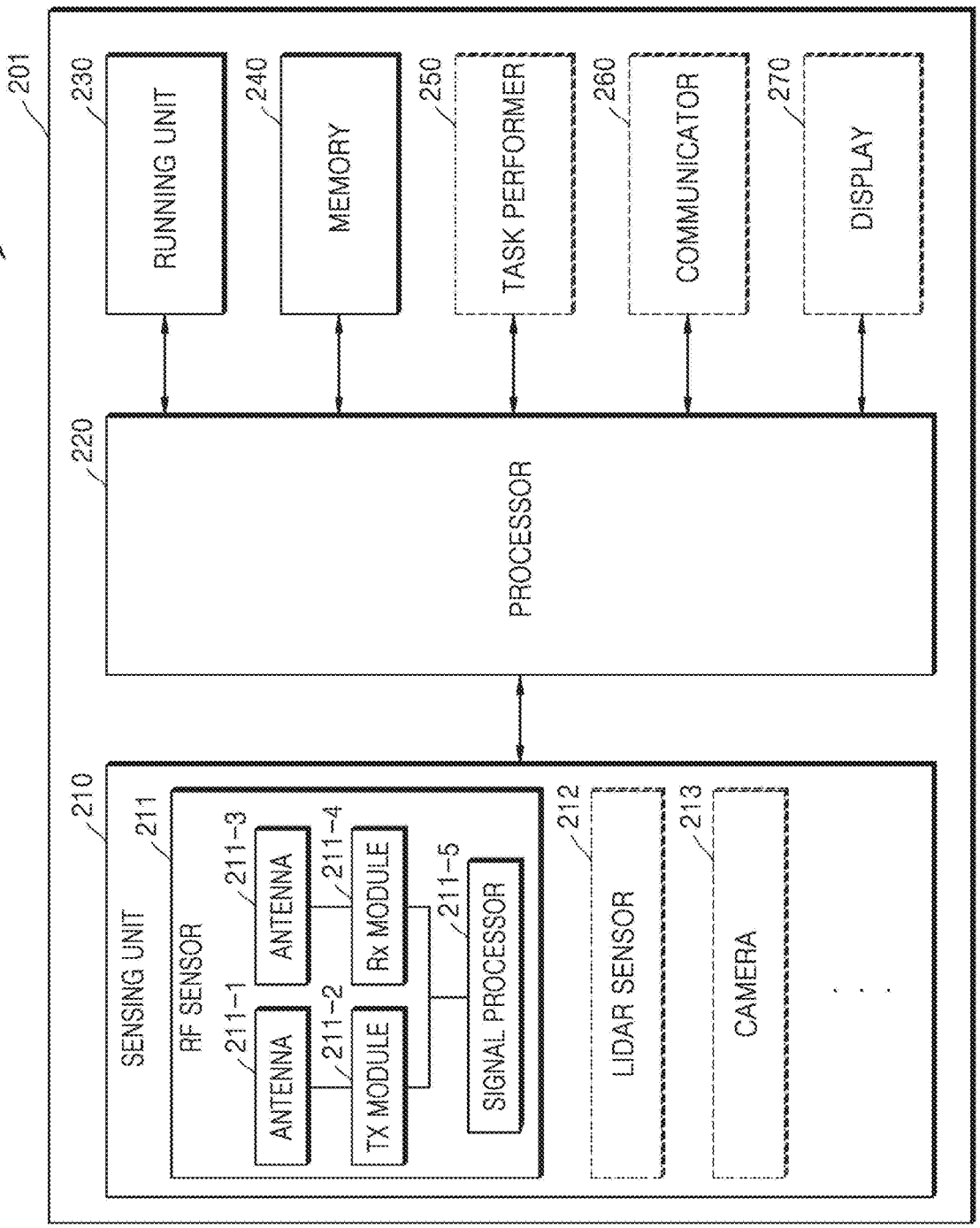
FIG. 2 is a block diagram of a moving device according to an embodiment of the disclosure.

FIG. 2 is a block diagram of a moving device according to an embodiment of the disclosure.

Referring to FIG. 2, the moving device 1 may include a body 201 configured to provide a housing where other elements are mounted, a sensing unit 210 configured to sense a surrounding environment of the moving device 1, a processor 220 configured to control operations of other elements of the moving device 1, a running unit 230 configured to move the moving device 1 toward a certain direction, and a memory 240 storing data, e.g., a control program, an application, and an algorithm, for operations of the moving device 1. According to various embodiments of the disclosure, the moving device 1 may further include a task performer 250 configured to perform a task based on a specific purpose. The moving device 1 may further include a communicator 260 and a display 270.

The sensing unit 210 includes at least one sensor capable of sensing the surrounding environment. The sensing unit 210 may be configured to sense the surrounding environment while the moving device 1 is moving or is performing a task.

The sensing unit 210 may include an RF sensor 211. According to various embodiments of the disclosure, the sensing unit 210 may further include a LiDAR sensor 212 and a camera 213. In addition, the sensing unit 210 may further include a three-dimensional (3D) sensor, a geomagnetic sensor, an infrared (IR) sensor, an ultrasonic sensor, a laser sensor, a radar sensor, and a position sensitive detector (PSD) sensor, but is not limited to the above-mentioned examples.

The RF sensor 211 may detect an object by using a radio wave signal of several GHz to several ten GHz. The RF sensor 211 may radiate, for example, an ultra-wideband (UWB) RF signal. Alternatively, the RF sensor 211 may radiate a frequency modulated continuous wave (FMCW) signal or a phase modulated continuous wave (PMCW) signal. The RF sensor 211 has a high signal transmittance and thus may detect even underfloor objects. When the RF sensor 211 is used, interference with other narrow-band signals (e.g., global positioning system (GPS), Bluetooth, Zigbee, and wireless local region network (WLAN) signals) may be minimized. In FIG. 2, the RF sensor 211 may include a transmitter (Tx) antenna 211-1 and a Tx module 211-2 for radiating an RF signal, and a receiver (Rx) antenna 211-3 and an Rx module 211-4 for receiving a signal reflected from an aboveground or underground object ahead. The Tx antenna 211-1 and the Rx antenna 211-3 may be provided in plural numbers, and the Tx module 211-2 and the Rx module 211-4 may be provided in the same numbers as the Tx antenna 211-1 and the Rx antenna 211-3, or be provided with switches. A signal processor 211-5 may perform functions for transmitting or receiving a signal through a radio channel, e.g., band conversion and amplification of the signal. For example, the signal processor 211-5 may up-convert a baseband signal into an RF-band signal and then transmit the RF-band signal through an antenna, and down-convert an RF-band signal received through an antenna, into a baseband signal. The signal processor 211-5 may include, for example, a Tx filter, an Rx filter, an amplifier, a mixer, an oscillator, a digital-to-analog convertor (DAC), and an analog-to-digital convertor (ADC), but is not limited to the above-mentioned examples, and some of the functions of the signal processor 211-5 may be performed by the Tx module 211-2 or the Rx module 211-4.

The camera 213 may include a lens and an image sensor through which a captured image is transmitted. The image sensor may use a complementary metal-oxide semiconductor (CMOS) sensor or a charge coupled device (CCD) sensor, and the moving device 1 may capture an image of a region ahead by using the camera 213, and convert the capture image into a digital image.

The camera 213 may include various types of optical lenses to capture an image of a surrounding environment at a wide angle or at a high resolution. According to an embodiment of the disclosure, the camera 213 may use a wide-angle lens to photograph a whole surrounding region at a certain location. The camera 213 may be mounted upward to photograph a whole region of the ceiling. The moving device 1 may autonomously recognize a location thereof based on captured image data of the ceiling, or generate a map of a task region. The generated map may be modified using image data, and the moving device 1 may generate an integrated map of a whole task region by using image data captured by other moving devices.

To move the moving device 1, the running unit 230 may basically include one or more wheels in contact with the floor, a motor serving as a driving unit for generating driving force for movement, and a link and shaft structure for transferring the driving force of the motor to the wheels. For example, the running unit 230 may individually drive a plurality of wheels to control the moving device 1 in various manners to move forward, move backward, rotate, or turn. A direction and a speed of the moving device 1 controlled by the running unit 230 to move may be determined based on a control signal transmitted from the processor 220 to the motor.

In an embodiment of the disclosure, the running unit 230 may further include a steering tool for physically changing angles of the plurality of wheels based on a control signal of the processor 220. In this case, rotation counts of the plurality of wheels of the running unit 230 may be controlled based on the control signal of the processor 220, and thus the moving device 1 may be easily controlled in a travel direction, i.e., easily steered.

The memory 240 is provided as a space in which data is stored or loaded. The memory 240 includes non-volatile memory for storing data regardless of application of system power, and volatile memory for temporarily storing data processed by the processor 220, e.g., a control program. For example, the non-volatile memory may include flash memory, erasable programmable read-only memory (EPROM), a hard disk drive (HDD), a solid state drives (SDD), or read-only memory (ROM), and the volatile memory may include random access memory (RAM) or a buffer. The memory 240 may store data, e.g., a control program, an application, and an algorithm, for operations, e.g., cleaning, charging, and traveling, of the moving device 1.

According to an embodiment of the disclosure, the memory 240 may store the map of the task region. The map may include information indicating an aboveground object located on the ground in the task region, and an underground object. The map may include structure information indicating an aboveground structure of the task region, aboveground distribution information indicating distribution of the aboveground object located on the ground in the task region, and underground distribution information indicating distribution of the underground object located under the ground in the task region, but is not limited thereto. The map may be implemented as an integrated map of at least two of a structure map indicating an aboveground structure of the task region, an aboveground map indicating distribution of the aboveground object, and an underground map indicating distribution of the underground object. The map may include information indicating characteristics of the aboveground and underground objects of the task space.

The task performer 250 may include, for example, elements for achieving the purpose of cleaning the floor. For example, the task performer 250 may include a brush for scattering a foreign substance, e.g., dust, on the floor, a suction module for sucking up the scattered foreign substance, and a dust bin for storing the sucked foreign substance. The task performer 250 may operate and clean the floor while the moving device 1 is being controlled by the running unit 230 to move or the moving device 1 stops. Specifically, the task performer 250 may include a drum brush for scattering dust of a task space, a pair of side brushes for guiding the dust of the task space toward the drum brush, and a dust bin for sucking in and storing the dust scattered by the drum brush. The drum brush may be provided in a dust inlet generated in a bottom surface of the body 201, and rotate about a rotation axis parallel with the bottom surface of the body 201 and scatter the dust of the task space into the dust inlet. The side brushes may be mounted at front left and right edges of the bottom surface of the body 201. The side brushes may be mounted in front of a pair of wheels, and rotate about a rotation axis perpendicular to the bottom surface of the body 201 and guide the dust of the cleaning region, which is not cleaned by the drum brush, toward the drum brush. The side brushes may protrude from the body 201 and thus extend a region cleaned by the moving device 1.

The processor 220 may be a circuit implemented as at least one of a central processing unit (CPU), a combination of a chipset and a microcontroller, or a system on chip (SoC). The processor 220 may perform calculation and control operations for overall operations performed by the moving device 1, based on the control program stored in the memory 240. The control program may include program(s) configured in the form of at least one of a basic input/output system (BIOS), a device driver, an operating system, firmware, a platform, or an application. According to an embodiment of the disclosure, the application may be previously installed or stored in a manufacturing process of the moving device 1, or be installed in the moving device 1 afterward based on application data received from outside. The application data may be, for example, downloaded from an external server, e.g., an application market, to the moving device 1.

According to an embodiment of the disclosure, the processor 220 includes a navigation module for generating a control signal to control movement of the moving device 1, and a simultaneous localization and mapping (SLAM) module for determining a current location of the moving device 1. The processor 220 may generate the map of the task region while moving, i.e., traveling, in a cleaning region based on the control signal generated by the navigation module. The SLAM module may be configured to support a localization function for determining the current location of the moving device 1 based on data obtained by the sensing unit 210, and a re-localization function for re-determining the current location by further using characteristics information of aboveground and/or underground objects. Due to the operation of the SLAM module, the characteristics information of the aboveground and/or underground objects may be generated.

According to various embodiments of the disclosure, the sensing unit 210 may radiate an RF signal, and detect a signal reflected from an aboveground object in front of the moving device 1, and an underground object. The processor 220 may determine characteristics of an object, based on a reflected signal detected by the sensing unit 210 and an underground reflected signal corresponding to the location of the moving device 1 in the map stored in the memory 240. The characteristics of the object may include at least one of, for example, location information of the object, distance information from the moving device 1 to the object, material information of the object, or type information of the object.

According to various embodiments of the disclosure, the processor 220 may correct the reflected signal by removing at least a part of the underground reflected signal from the reflected signal detected by the sensing unit 210. The processor 220 may determine the characteristics of the object, based on the corrected reflected signal.

According to various embodiments of the disclosure, the sensing unit 210 may radiate an RF signal and detect an underground reflected signal reflected from at least one underground object in front of or under the moving device 1. The processor 220 may generate an underground map indicating the underground object, based on the underground reflected signal detected by the sensing unit 210, and a location of the moving device 1 at a time when the underground reflected signal is detected.

According to various embodiments of the disclosure, the processor 220 may correct a map of a region of interest where the moving device 1 performs a task, by using an underground object estimated based on underground reflected signals, as a landmark.

According to various embodiments of the disclosure, to generate the underground map, the processor 220 may provide guide information for requesting to remove an aboveground object.

According to various embodiments of the disclosure, the sensing unit 210 may include a first RF sensor and a second RF sensor. In this case, the first RF sensor for detecting an underground object and the second RF sensor for detecting an aboveground object may be mounted at different locations to radiate RF signals in different directions. For example, the first RF sensor may be mounted to radiate an RF signal in a forward direction of the moving device 1, and the second RF sensor may be mounted to radiate an RF signal in a downward direction of the moving device 1.

The moving device 1 may further include various elements, e.g., a user interface (not shown) mounted on the body 201 to receive user input and display status information of the moving device 1. According to an embodiment of the disclosure, the user interface may include input buttons such as a power button for turning on or off the moving device 1, an operation toggle button for starting and stopping an operation of the moving device 1, and a return button for returning the moving device 1 to a charging station (not shown). The input buttons may employ a micro switch or a membrane switch for detecting a command based on pressing of a user, or a touch pad for detecting a command based on touch of the user. The user interface may further include a voice inputter for receiving voice/sound uttered by the user. The voice inputter may be implemented as a microphone for receiving a voice signal.

The user interface may include a display for displaying a current status of the moving device 1 and a status based on the user input. The display may display a current time, a battery status, and operation information of the moving device 1, e.g., a task mode. The display may employ a liquid crystal display (LCD) panel, a light-emitting diode (LED) panel, or an organic light-emitting diode (OLED) panel.

The moving device 1 may further include a charger (not shown). The charger is fixed and installed at a location in a task environment of the moving device 1, and is connected to an external power source. In an embodiment of the disclosure, the charger may be installed at a certain location of any one individual task region. The charger may basically charge a battery of the moving device 1 and perform various maintenance operations of the moving device 1 when the body 201 is docked. The charger may further include a charging connector connectable to a charging terminal of the body 201, and a power control circuit for converting external power (e.g. an alternating current (AC) voltage) into charging power (e.g., a direct current (DC) voltage) and supplying the charging power through the charging connector to the battery of the moving device 1.

The moving device 1 may further include the communicator 260. The communicator may include hardware, e.g., a communication circuit or a communication chip, for wirelessly communicating with an external device (e.g., another home appliance or another moving device) based on various wireless communication protocols. The communicator may communicate with another external device directly or through a certain network by accessing an access point (AP), based on a protocol supported thereby. Examples of the wireless communication protocols supported by the communicator may include wireless fidelity (Wi-Fi), Bluetooth, infrared data association (IrDA), RF, Zigbee, Wi-Fi direct (WFD), and long term evolution (LTE). The moving device 1 according to an embodiment of the disclosure may further communicate with at least one external device, e.g., a charging station (not shown), a user device (not shown), or a server, through the communicator.

The moving device 1 may further include a battery (not shown) for supplying power to operate the moving device 1. The battery may be configured to be rechargeable when internal power of the moving device 1 is used up. The battery provides power of a preset voltage to each element of the moving device 1 based on a control signal received from the processor 220. The battery may include a terminal for transmitting power provided through the charging connector of the charging station, to the battery while the moving device 1 is being docked in the charging station. The battery may include a sensor for detecting a state of charge, and thus the processor 220 may check the state of charge of the battery.

The communicator 260 may include one or more elements for enabling the moving device 1 to communicate with an external device (not shown). For example, the communicator 260 may include a short-range wireless communicator (not shown) and a mobile communicator (not shown). The external device communicating with the moving device 1 may include, for example, a mobile device and a server. In this case, the mobile device may provide a function for controlling operation of the moving device 1, and the server may provide, to the moving device 1, information required to generate a map and perform a task.

The short-range wireless communicator may include a Bluetooth communicator, a Bluetooth low energy (BLE) communicator, a near field communicator, a WLAN (or Wi-Fi) communicator, a Zigbee communicator, an IrDA communicator, a WFD communicator, a UWB communicator, or an Ant+ communicator, but is not limited thereto.

The mobile communicator transmits or receives a wireless signal to or from at least one of a base station, an external device, or a server on a mobile communication network. Herein, the wireless signal may include various types of data based on transmission or reception of a voice call signal, a video call signal, or a text/multimedia message.

The display 270 may display information processed by the moving device 1. For example, the display 270 may display a user interface for controlling the moving device 1 to perform a task whiling moving in a task space.

When the display 270 and a touchpad are layered to configure a touchscreen, the display 270 may be used not only as an output device but also as an input device. The display 270 may include at least one of an LCD, a thin film transistor-LCD (TFT-LCD), an OLED, a flexible display, a 3D display, or an electrophoretic display. Depending on implementation of the moving device 1, the moving device 1 may include two or more displays 270.

Figure 3:
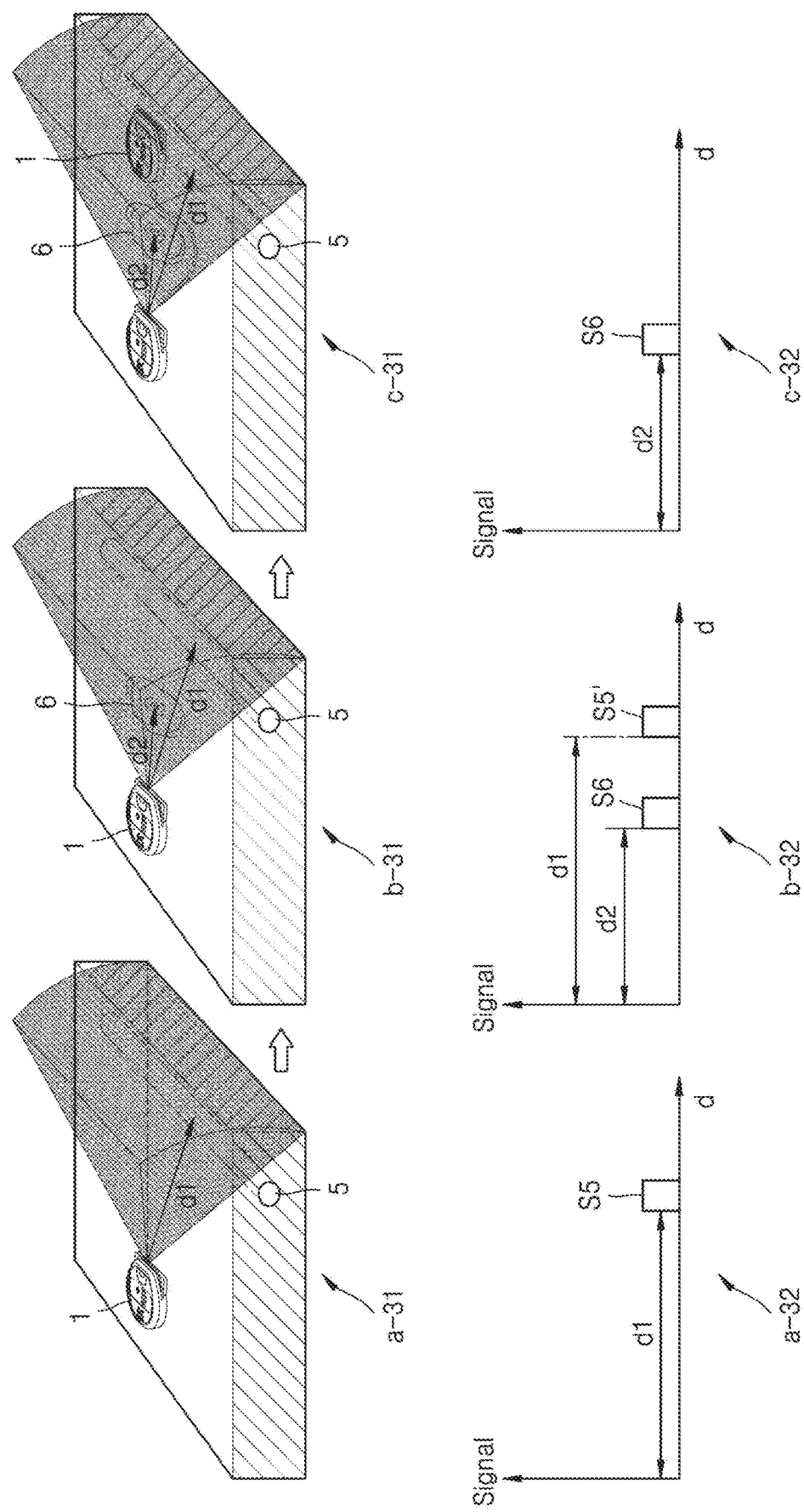
FIG. 3 is a conceptual view for describing operations of a moving device, according to an embodiment of the disclosure.

FIG. 3 is a conceptual view for describing operations of a moving device, according to an embodiment of the disclosure.

Initially, as illustrated in (a-31) of FIG. 3, the moving device 1 (e.g., a robotic cleaner) may move in a region of interest (e.g., a house) and detect an underground reflected signal. For example, the sensing unit 210 of the moving device 1 may radiate an RF signal in a forward direction or a downward direction of the moving device 1. As shown in (a-32) of FIG. 3, the sensing unit 210 may detect an underground reflected signal S5 reflected from the underground object 5 (or an underground reflected signal source) in front of or under the moving device 1. The underground object 5 may be a stationary object, e.g., a pipe or a rebar under the floor.

The processor 220 of the moving device 1 may store the detected underground reflected signal S5 to correspond to a location of the moving device 1 at a time when the underground object 5 is detected. For example, the processor 220 of the moving device 1 may pair and store the location of the moving device 1 and the underground reflected signal S5.

Herein, the location of the moving device 1 at the time when the underground object 5 is detected may include, for example, a location of the moving device 1 at a time when the RF signal is radiated, a location of the moving device 1 at a time when the underground reflected signal S5 is detected, or a location of the moving device 1 at a timing between the time when the RF signal is radiated and the time when the underground reflected signal S5 is detected. Because a speed of the RF signal is much faster than a speed of the moving device 1, the location of the moving device 1 at the time when the RF signal is radiated may be actually the same as the location of the moving device 1 at the time when the underground reflected signal S5 is detected. The location of the moving device 1 corresponding to the time when the RF signal is radiated may be actually the same as the location of the moving device 1 corresponding to the time when the underground reflected signal S5 is detected.

The processor 220 of the moving device 1 may generate a map including distribution information of underground reflected signals detected in the region of interest, by using the underground reflected signal S5 paired with the location of the moving device 1. The moving device 1 may generate an underground map indicating distribution of the underground object 5. A specific example thereof will be described in detail below with reference to FIGS. 6A, 6B and 7.

Referring to FIG. 3, the moving device 1 may continuously move in the region of interest. For example, the moving device 1 may move in the region of interest to clean the region of interest or to respond to a call of a user. While moving in the region of interest, to detect an aboveground object 6, the sensing unit 210 of the moving device 1 may radiate an RF signal in a forward direction of the moving device 1. As shown in (b-32) of FIG. 3, the moving device 1 may detect a signal reflected from the aboveground object 6 and the underground object 5 ahead. The reflected signal may include an aboveground reflected signal S6 reflected from the aboveground object 6 and an underground reflected signal S5' reflected from the underground object 5.

Then, as illustrated in (c-32) of FIG. 3, the processor 220 may obtain a corrected reflected signal, based on the detected reflected signal and the underground reflected signal S5 stored to correspond to the location of the moving device 1. For example, the processor 220 may extract, from the memory 240, the underground reflected signal S5 corresponding to the location of the moving device 1, and correct or calibrate the reflected signal by removing at least a part of the underground reflected signal S5 from the reflected signal received in (b-32) of FIG. 3. Specifically, the processor 220 may obtain a corrected reflected signal S6 by removing an underground reflected signal corresponding to a location of the moving device 1 at a time when the aboveground object 6 (e.g., the underground reflected signal S5 of (a-32) of FIG. 3) is detected, from the reflected signal including the aboveground reflected signal S6 reflected from the aboveground object 6 and the underground reflected signal S5' reflected from the underground object 5.

Herein, the location of the moving device 1 at the time when the aboveground object 6 is detected may include, for example, a location of the moving device 1 at a time when the RF signal is radiated, a location of the moving device 1 at a time when the reflected signal is detected, or a location of the moving device 1 at a timing between the time when the RF signal is radiated and a time when the aboveground reflected signal S6 is detected.

The processor 220 may determine characteristics of the aboveground object 6, based on the aboveground reflected signal S6. The characteristics of the aboveground object 6 may include at least one of, for example, location information of the aboveground object 6, distance information from the moving device 1 to the aboveground object 6, material information of the aboveground object 6, or type information of the aboveground object 6. For example, the processor 220 may determine a material (or a medium) of the aboveground object 6 by analyzing permittivity or permeability of the aboveground object 6 based on the aboveground reflected signal S6. The processor 220 may determine whether the aboveground object 6 is made of a solid (e.g., metal or wood) or a liquid.

When the characteristics of the aboveground object 6 are determined, the processor 220 may control travel of the moving device 1 based on the characteristics of the aboveground object 6.

For example, as illustrated in (c-31) of FIG. 3, the processor 220 may control the running unit 230 in such a manner that the moving device 1 bypasses the aboveground object 6. The aboveground object 6 to be bypassed may include, for example, water, liquids, and excreta. Alternatively, the processor 220 may control the running unit 230 in such a manner that the moving device 1 goes over the aboveground object 6. Alternatively, the processor 220 may control the task performer 250 in such a manner that the moving device 1 cleans (e.g., sucks up) the aboveground object 6.

Figure 4:
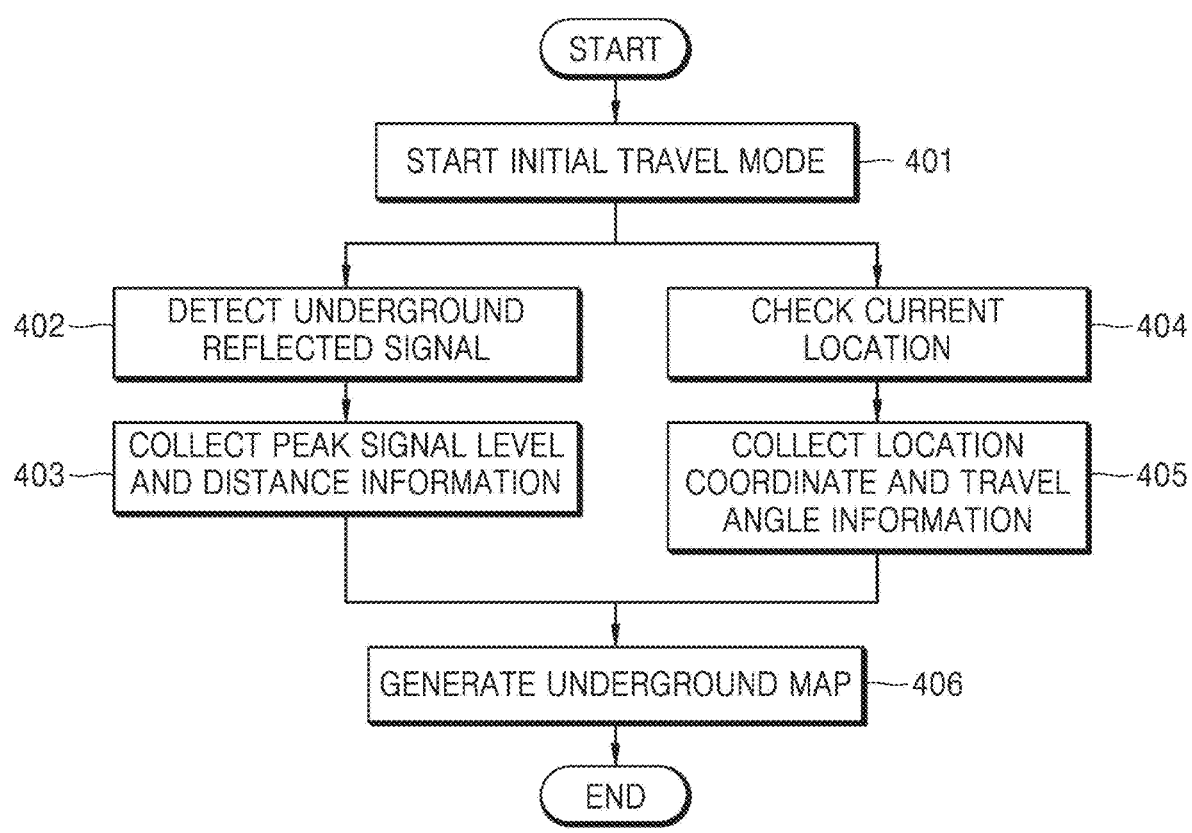
FIG. 4 is a flowchart of a method, performed by a moving device, of generating an underground map, according to an embodiment of the disclosure.

FIG. 4 is a flowchart of a method, performed by a moving device, of generating an underground map, according to an embodiment of the disclosure.

Referring to FIG. 4, the moving device 1 may start an initial travel mode (401). The initial travel mode may be a mode for detecting underground objects before the moving device 1 (e.g., a robotic cleaner) performs a main task. For example, the initial travel mode may be a mode for collecting information about the structure of a task space and aboveground and underground objects in the task space before the moving device 1 performs a cleaning task.

When the initial travel mode is started, the moving device 1 may radiate an RF signal while moving in, for example, a region of interest (e.g., a house), and detect an underground reflected signal reflected from an underground object (402). When the underground reflected signal is detected, the moving device 1 may collect a peak signal level and distance information, based on the detected underground reflected signal, and a time difference between a timing when the RF signal is radiated and a timing when the underground reflected signal is received (403).

When the initial travel mode is started, the moving device 1 may check a current location of the moving device 1 (404). For example, the moving device 1 may recognize a location thereof by using SLAM technique. SLAM may refer to a technique by which the moving device 1 generates a map of a target space and, at the same time, estimates a location thereof by obtaining surrounding environment information and processing the obtained information. Specifically, the moving device 1 may generate the map and estimate the location thereof based on image data of the ceiling captured using a camera having a wide viewing angle.

When the current location is checked, the moving device 1 may collect a location coordinate and travel angle information of the moving device 1 with reference to the current location (405). The travel angle information may include, for example, an angle by which the moving device 1 is tilted (or slanted) from a central axis thereof (e.g., a Y axis).

The moving device 1 may generate an underground map (e.g., a virtual underfloor map) by using the information collected in operations 403 and 405 (406).

The moving device 1 may generate the underground map by inputting the information collected in operations 403 and 405 to a certain learning model for generating an underground map. In this case, the learning model for generating an underground map may be previously included in the moving device 1 in a manufacturing process thereof, but is not limited thereto. The moving device 1 may receive, from a certain server, the learning model for generating an underground map, generate the underground map by using the received learning model, and update the received learning model. Alternatively, the learning model for generating an underground map may be managed by the certain server. In this case, the moving device 1 may request an underground map from the server by providing the information collected in operations 403 and 405, and receive, from the server, an underground map generated by the server. The learning model for generating an underground map may be, for example, a model based on a neural network. For example, the learning model for generating an underground map may use a DNN model, an RNN model, or a BRDNN model, but is not limited thereto.

Figure 5:
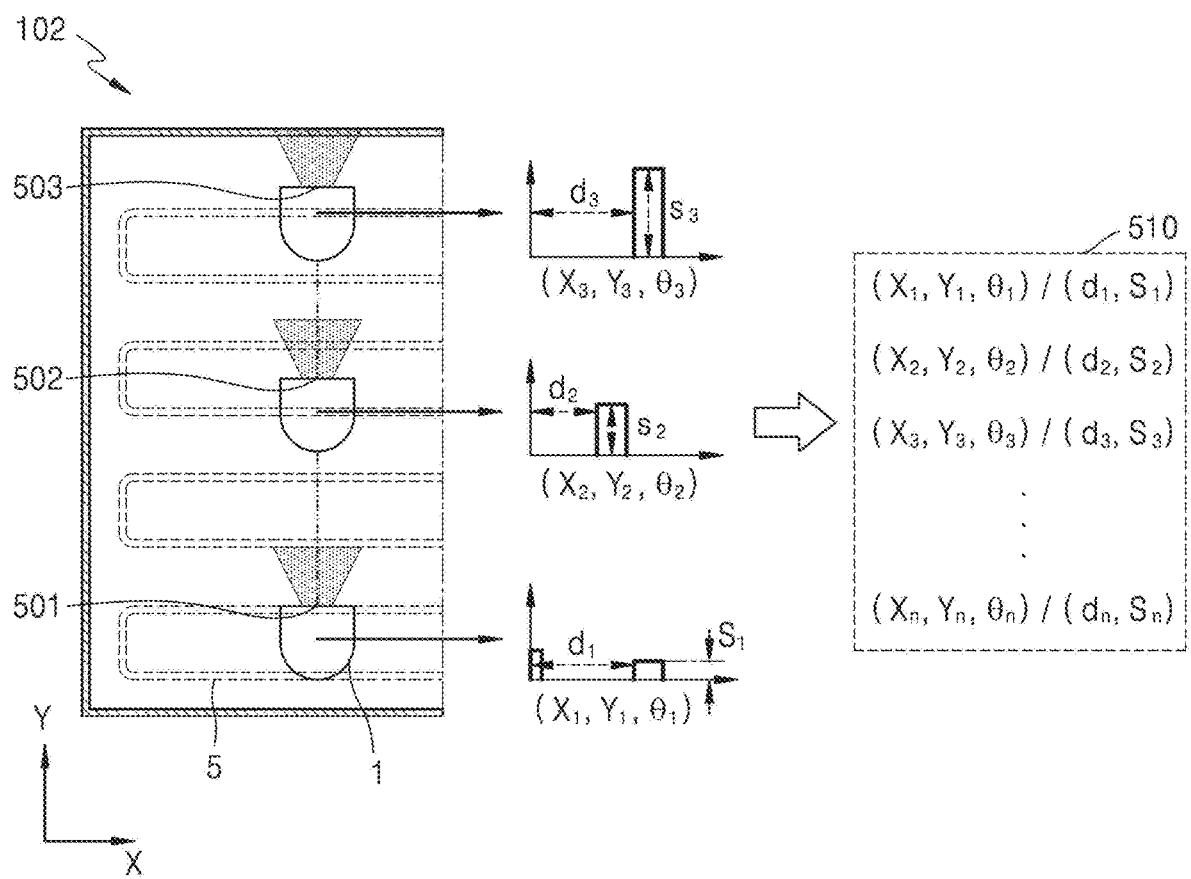
FIG. 5 is a conceptual view for describing a method, performed by a moving device, of collecting travel information and underground reflected signals, according to an embodiment of the disclosure.

FIG. 5 is a conceptual view for describing a method, performed by a moving device, of collecting travel information and underground reflected signals, according to an embodiment of the disclosure.

Specifically, referring to FIG. 5, the moving device 1 may travel in a Y direction at one space 102 in a house. In this case, the moving device 1 may collect a peak signal level, distance information, a location coordinate, and travel angle information at every location (e.g., at every location of the RF sensor 211) where the moving device 1 travels. The location coordinate may be, for example, an absolute location coordinate with respect to a bottom left point or a feature point of the one space 102, or a relative location coordinate.

For example, at a first point 501 of FIG. 5, the moving device 1 may collect a location coordinate $(X_1, Y_1)$ of the moving device 1 and a travel angle $\theta_1$ of the moving device 1. The moving device 1 may collect a peak signal level $S_1$ included in an underground reflected signal reflected from the underground object 5 (e.g., a pipe under the floor). The moving device 1 may collect a distance $d_1$ to the underground object 5 based on a time difference between a timing when an RF signal is radiated and a timing when the underground reflected signal is received. Similarly, at a second point 502, the moving device 1 may collect a location coordinate $(X_2, Y_2)$ and a travel angle $\theta_2$ of the moving device 1, and collect a peak signal level $S_2$ from and a distance $d_2$ to the underground object 5. Similarly, at a third point 503, the moving device 1 may collect a location coordinate $(X_3, Y_3)$ and a travel angle $\theta_3$ of the moving device 1, and collect a peak signal level $S_3$ from and a distance $d_3$ to the underground object 5.

As described above, the moving device 1 may obtain the peak signal level, the distance information, the location coordinate, and the travel angle information over the entirety of the one space 102 as indicated by reference numeral 510 of FIG. 5, by collecting the above-mentioned information in a certain cycle or in every event while traveling in the one space 102.

When the peak signal level, the distance information, the location coordinate, and the travel angle information are collected over the entirety of the one space 102, the moving device 1 may generate an underground map by using the collected information.

Figure 6A:
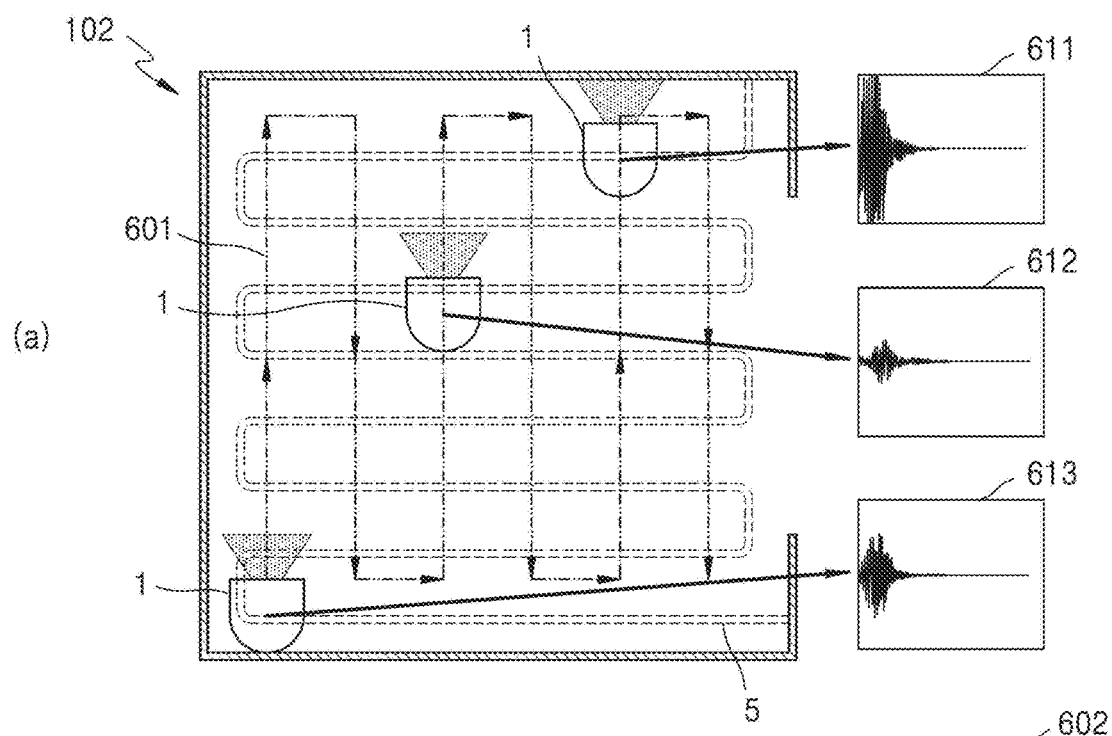
FIG. 6A is a diagram for describing a method, performed by a moving device, of generating an underground map while moving, according to an embodiment of the disclosure.

FIG. 6A is a diagram for describing a method, performed by a moving device, of generating an underground map while moving, according to an embodiment of the disclosure.

Referring to FIG. 6A, the moving device 1 may collect underground reflected signals 611, 612, and 613 reflected from the underground object 5, while traveling along a certain route 601 in the one space 102. The moving device 1 may generate an underground map including distribution information of the underground reflected signals 611, 612, and 613 of the one space 102, by gathering the underground reflected signals collected at every point of the one space 102. The underground map may indicate distribution of the underground object 5.

Figure 6B:
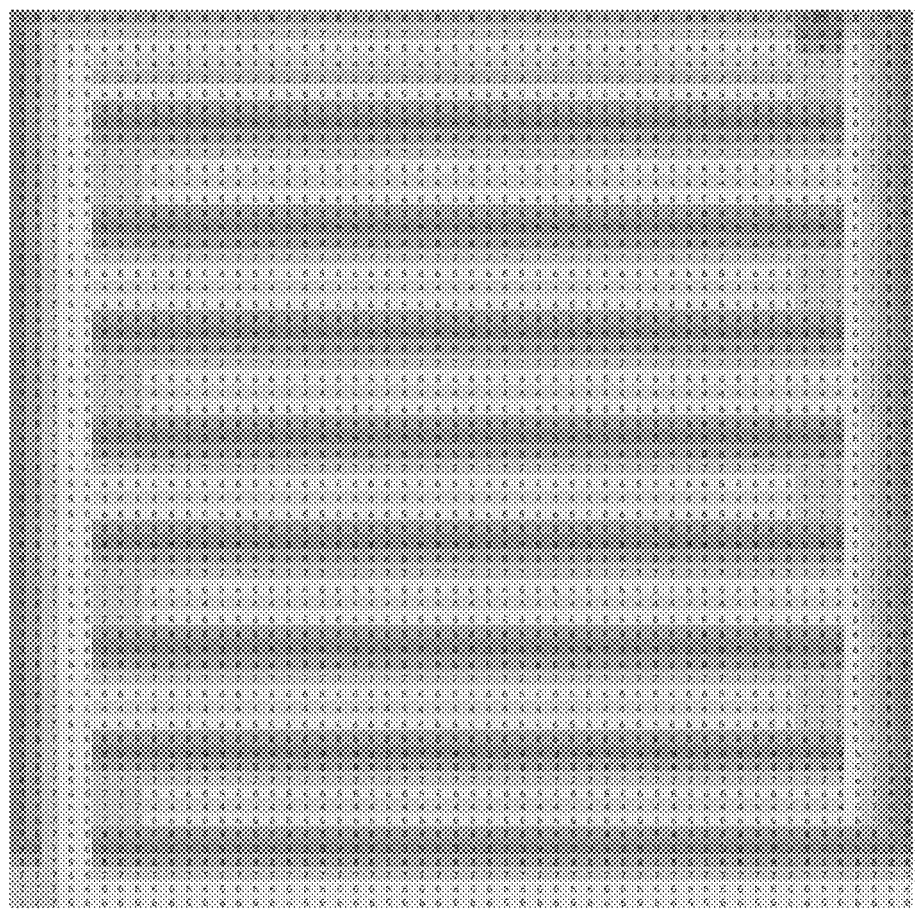
FIG. 6B is an example of an underground map, according to an embodiment of the disclosure.

FIG. 6B illustrates an example of an underground map, according to an embodiment of the disclosure.

Referring to FIG. 6B, underground map 602 is depicted including distribution information of underground reflected signals according to an embodiment of the disclosure. The underground map 602 may include underground reflected signals of every point of the one space 102. In this case, signal levels of underground reflected signals at points where the underground object 5 is located in the one space 102 may be higher than signal levels of underground reflected signals at other points.

According to various embodiments of the disclosure, the moving device 1 may auxiliarily use the underground map to generate a map of a region of interest (e.g., a house) where the moving device 1 performs a task (e.g., a cleaning task). For example, the moving device 1 may correct the map of the region of interest by using underground objects (e.g., pipes and walls under the floor) estimated based on the underground reflected signals, as landmarks (or feature objects or reference objects).

According to various embodiments of the disclosure, when the moving device 1 detects the underground reflected signals to generate the underground map and when an aboveground object is present in the region of interest, the underground objects may not be accurately detected due to the aboveground object. In this case, the moving device 1 may provide, to an outputter (not shown), guide information for requesting to remove the aboveground object located in the region of interest, before the initial travel mode is started to generate the underground map. The outputter may display the received guide information on a screen or output the received guide information through a speaker. For example, the outputter may output a voice message telling 'Please remove object to generate home cleaning map'. In this case, the moving device 1 may identify the type of the aboveground object, and determine whether to output the guide information, based on the type of the aboveground object.

According to various embodiments of the disclosure, although the aboveground object is present in the region of interest, the moving device 1 may not support a function of outputting the guide information for requesting to remove the aboveground object to generate the underground map, or a user may not remove the aboveground object.

Figure 7:
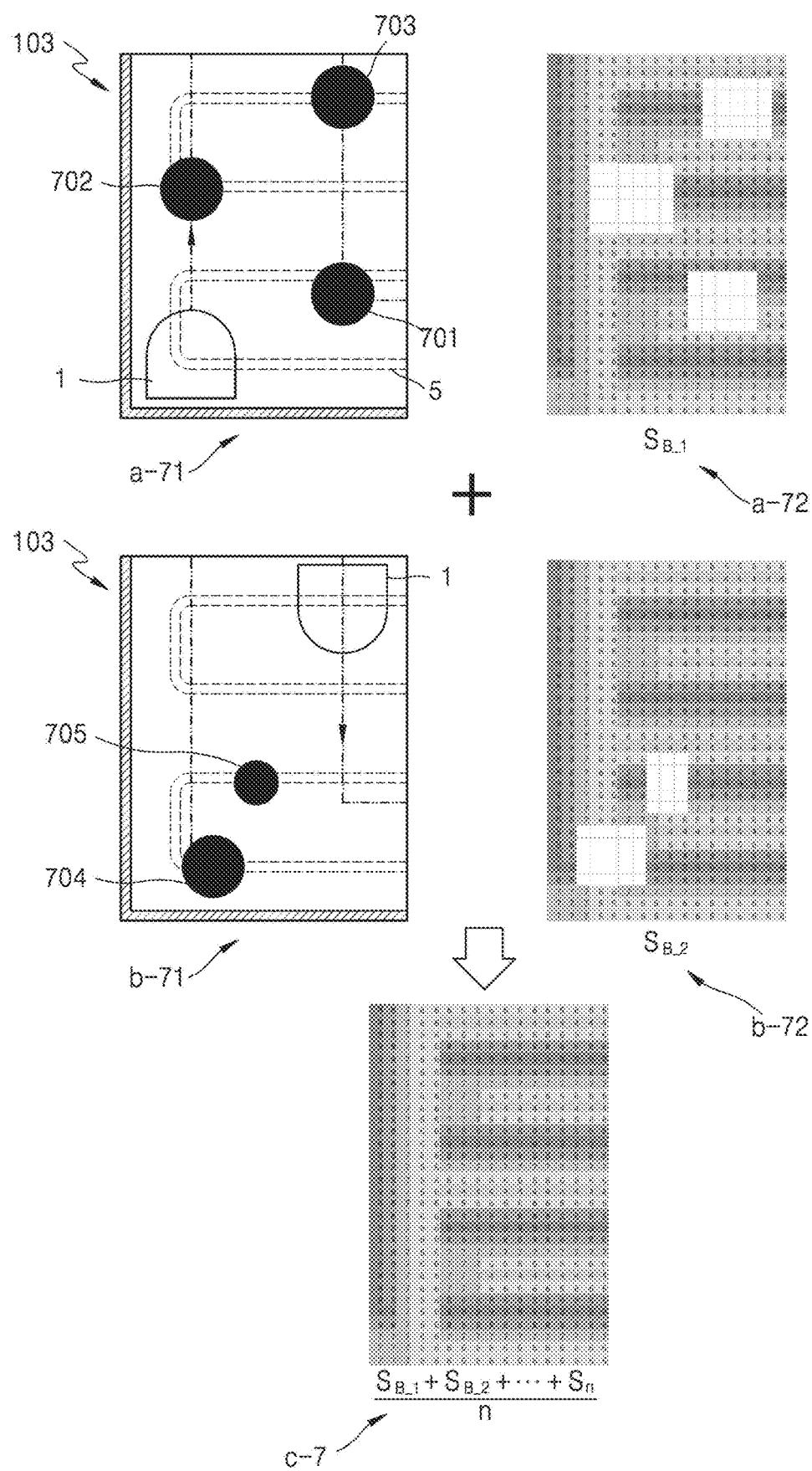
FIG. 7 is a diagram for describing a method of generating an integrated underground map by using sub-underground maps, according to an embodiment of the disclosure.

FIG. 7 is a diagram for describing a method of generating an integrated underground map by using sub-underground maps, according to an embodiment of the disclosure.

Referring to FIG. 7, the moving device 1 may generate an integrated underground map by using a plurality of sub-underground maps.

For example, when the moving device 1 travels in one space 103 and when aboveground objects 701, 702, and 703 are present as illustrated in (a-71) of FIG. 7, the moving device 1 may generate a sub-underground map illustrated in (a-72) of FIG. 7, by detecting the underground object 5 only in a region other than regions where the aboveground objects 701, 702, and 703 are present. Specifically, the moving device 1 may check locations of the aboveground objects 701, 702, and 703 by using the camera 213 included in the moving device 1. The moving device 1 may radiate an RF signal considering the checked locations of the aboveground objects 701, 702, and 703, and generate the sub-underground map by detecting underground reflected signals reflected from the underground object 5. Alternatively, the moving device 1 may generate an underground map by using underground reflected signals detected when aboveground objects are present, and generate a sub-underground map by removing, from the generated underground map, regions where the aboveground objects are present.

Similarly, when the moving device 1 travels in a part of the one space 103 and when aboveground objects 704 and 705 are present as illustrated in (b71) of FIG. 7, the moving device 1 may generate a sub-underground map illustrated in (b72) of FIG. 7, by detecting the underground object 5 only in a region other than regions where the aboveground objects 704 and 705 are present.

When the sub-underground maps are generated as illustrated in (a-71) and (b-72) of FIG. 7, the moving device 1 may generate an integrated underground map as illustrated in (c-7) of FIG. 7, by combining the generated sub-underground maps. For example, the moving device 1 may generate the integrated underground map by averaging underground reflected signal level values repeatedly detected in the sub-underground maps of (a-71) and (b-72) of FIG. 7. Alternatively, the moving device 1 may generate the integrated underground map by maintaining underground reflected signal level values detected only in one of the sub-underground maps of (a-71) and (b-72) of FIG. 7.

Figure 8:
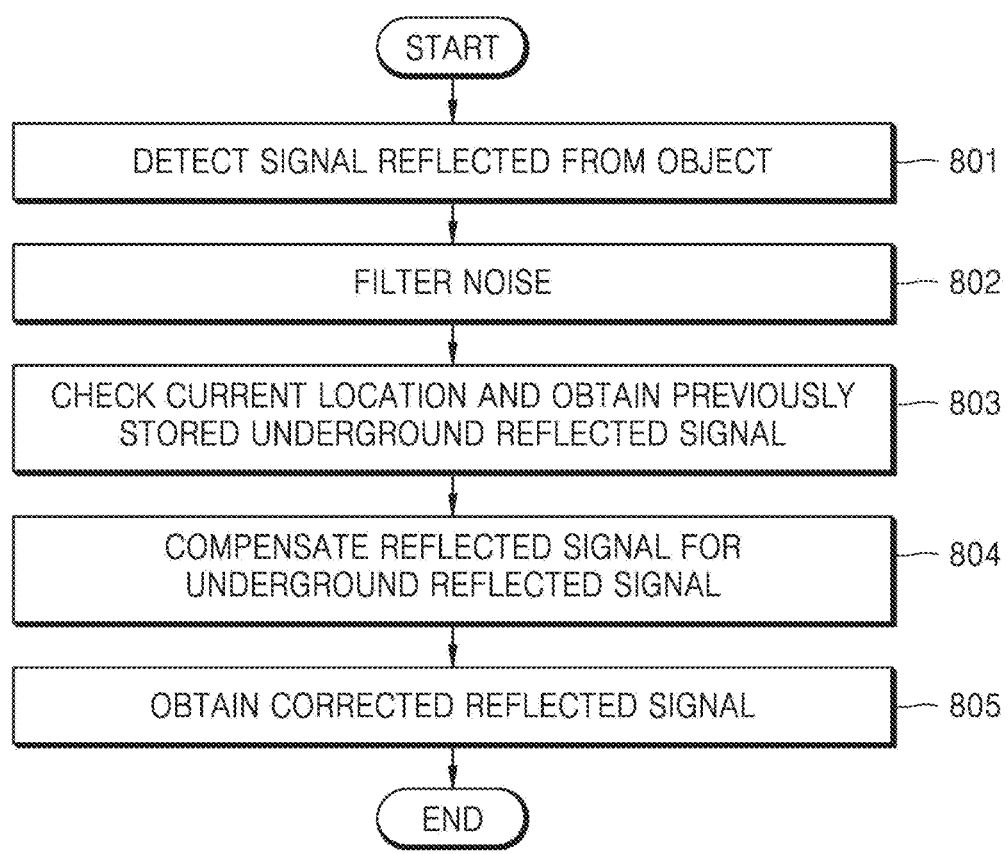
FIG. 8 is a flowchart of a method of detecting an aboveground reflected signal corresponding to an aboveground object, according to an embodiment of the disclosure.

FIG. 8 is a flowchart of a method of detecting an aboveground reflected signal, according to an embodiment of the disclosure.

Referring to FIG. 8, the moving device 1 may radiate an RF signal and detect a signal reflected from objects ahead (801). The objects ahead may include an aboveground object and an underground object.

FIGS. 9A, 9B, 9C and 9D are graphs showing detected reflected signals according to various embodiments of the disclosure.

Figure 9A:
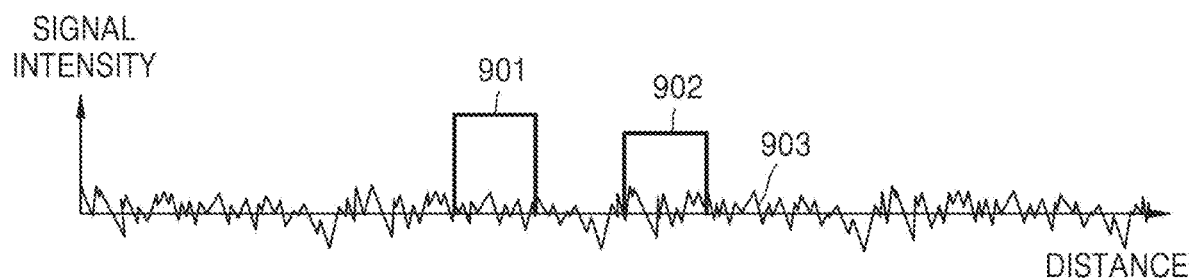
FIGS. 9A, 9B, 9C and 9D are graphs showing detected reflected signals according to various embodiments of the disclosure.

Referring to FIG. 9A, it shows a signal reflected from the objects ahead and detected by the moving device 1. The detected reflected signal may include all of an aboveground reflected signal 901, an underground reflected signal 902, and a noise signal 903.

The moving device 1 may filter (or remove) noise from the detected reflected signal (802). Herein, noise may not be an underground reflected signal reflected from an underground object but may be a signal generated due to interference, jamming, noise elements in the atmosphere, or the like.

Figure 9B:
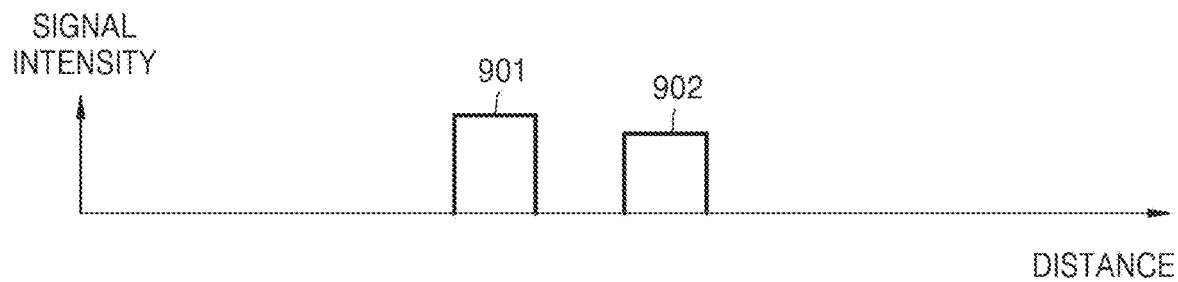

Referring to FIG. 9B, it shows a signal obtained by filtering noise from the detected reflected signal. The noise-filtered reflected signal may include the aboveground reflected signal 901 and the underground reflected signal 902.

The moving device 1 may check a current location of the moving device 1, and obtain (or retrieve) an underground reflected signal previously stored to correspond to the current location of the moving device 1 (803). For example, the moving device 1 may extract an underground reflected signal corresponding to the current location of the moving device 1 from an underground map previously stored in the moving device 1.

Figure 9C:
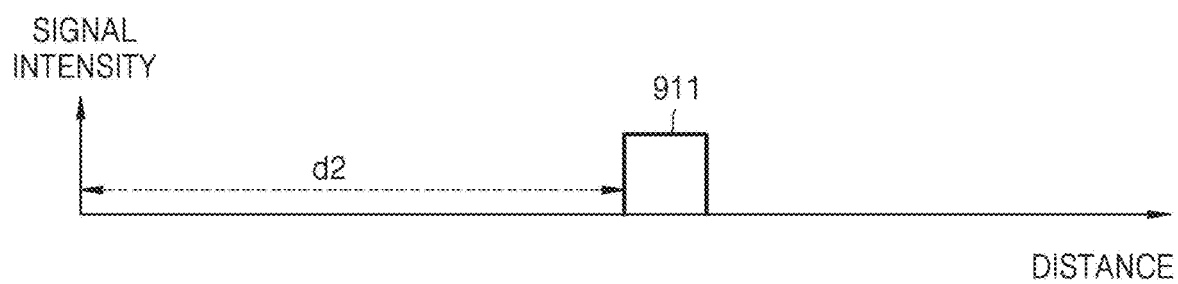

FIG. 9C shows an underground reflected signal 911 previously stored in the memory 240 to correspond to the current location of the moving device 1.

Referring to FIG. 9C, 'd2' may indicate a distance from the current location to an underground object corresponding to the underground reflected signal 911.

The moving device 1 may compensate the reflected signal for the underground reflected signal (804). For example, the moving device 1 may remove the underground reflected signal 911 of FIG. 9C from the reflected signal of FIG. 9B including the aboveground reflected signal 901 and the underground reflected signal 902.

As a result of the compensation, the moving device 1 may obtain a corrected reflected signal (or an aboveground reflected signal) (805).

Figure 9D:
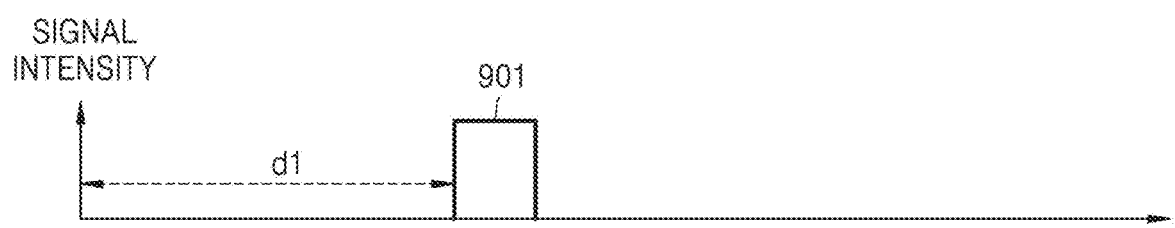

Referring to FIG. 9D, it shows a corrected reflected signal (or an aboveground reflected signal) 901 obtained by removing the underground reflected signal 911 of FIG. 9C from the noise-removed reflected signal of FIG. 9B. In this case, in FIG. 9D, 'd1' may indicate a distance from the current location to an aboveground object corresponding to the corrected reflected signal 901.

FIGS. 10A to 10C, 11A to 11C, and 12A to 12C are diagrams for describing operations of the moving device 1 using a plurality of RF sensors, according to various embodiments of the disclosure.

Referring to FIGS. 10A to 10C, 11A to 11C, and 12A to 12C, the sensing unit 210 of the moving device 1 may be implemented using a plurality of RF sensors or a multiple-input multiple-output (MIMO) antenna sensor. When the moving device 1 uses a plurality of RF sensors, a first RF sensor 1001 may be used to detect an underground object 1011, and a second RF sensor 1002 may be used to detect an aboveground object 1021. In this case, the first and second RF sensors 1001 and 1002 may be mounted at different locations. For example, the first RF sensor 1001 may be mounted in a downward direction of the moving device 1 to detect the underground object 1011, and the second RF sensor 1002 may be mounted in a forward direction of the moving device 1 to detect the aboveground object 1021. The moving device 1 may detect the underground object 1011 by using the first RF sensor 1001, and also detect the aboveground object 1021 by using the second RF sensor 1002.

According to various embodiments of the disclosure, when the sensing unit 210 of the moving device 1 uses a MIMO antenna sensor, a first antenna may be positioned to radiate an RF signal in a downward direction to detect the underground object 1011, and a second antenna may be positioned to radiate an RF signal in a forward direction to detect the aboveground object 1021.

When the moving device 1 uses a plurality of RF sensors, while the moving device 1 is traveling in a region of interest 104 as illustrated in FIG. 10A, the first RF sensor 1001 of the moving device 1 may detect the underground object 1011 and the second RF sensor 1002 may detect the aboveground object 1021 as illustrated in FIG. 10B. In this case, as illustrated in FIG. 10C, the moving device 1 may detect an underground reflected signal S1011 reflected from the underground object 1011 due to the detection of the first RF sensor 1001.

As another example, the moving device 1 may detect only the aboveground object 1021 by using the second RF sensor 1002.

Specifically, while the moving device 1 is traveling in the region of interest 104 as illustrated in FIG. 11A, the second RF sensor 1002 of the moving device 1 may detect the aboveground object 1021 as illustrated in FIG. 11B. However, the first RF sensor 1001 may radiate an RF signal toward a space where no underground object is present, and thus may not detect the underground object 1011. In this case, as illustrated in FIG. 11C, the moving device 1 may detect no underground reflected signal. Instead, the moving device 1 may detect a noise signal in the space.

As another example, the moving device 1 may detect an aboveground object and an underground object by using the first and second RF sensors 1001 and 1002.

Specifically, while the moving device 1 is traveling in the region of interest 104 as illustrated in FIG. 12A, the first RF sensor 1001 of the moving device 1 may detect a pipe 1012 under the floor as an underground object and the second RF sensor 1002 may detect a wall 1013 on the floor as an aboveground object as illustrated in FIG. 12B. In this case, as illustrated in FIG. 12C, the moving device 1 may detect an underground reflected signal S1012 reflected from the underground object (i.e., the pipe 1012) due to the detection of the first RF sensor 1001.

Referring to FIGS. 10A to 10C, 11A to 11C, and 12A to 12C, the moving device 1 having detected underground reflected signals by using the first and second RF sensors 1001 and 1002 may generate a map including distribution information of the detected underground reflected signals.

Then, when the moving device 1 performs a task, the moving device 1 may detect a signal reflected from at least one of an underground object or an aboveground object, by using the first and second RF sensors 1001 and 1002. When the reflected signal is detected, the moving device 1 may determine characteristics of the aboveground object by removing, from the detected reflected signal, an underground reflected signal corresponding to a location of the moving device 1.

When a dedicated RF sensor facing downward to detect an underground object is included as illustrated in FIGS. 10A to 10C, 11A to 11C, and 12A to 12C, the capability of the moving device 1 for detecting underground objects may be greatly increased. As described above, when underground reflected signals reflected from underground objects may be accurately detected, a precise underground map may be generated.

According to various embodiments of the disclosure, when the moving device 1 uses the first RF sensor 1001 for radiating an RF signal in a downward direction and the second RF sensor 1002 for radiating an RF signal in a forward direction, the moving device 1 may determine characteristics of an aboveground object in real time separately from generation of an underground map. For example, the moving device 1 may travel and obtain an aboveground reflected signal in real time by removing an underground reflected signal detected by the first RF sensor 1001, from an aboveground reflected signal and an underground reflected signal detected by the second RF sensor 1002. Based on the obtained aboveground reflected signal, the moving device 1 may determine characteristics of an aboveground object. As such, the moving device 1 may reduce a time taken to generate an underground map, and may rapidly detect objects by using RF sensors.

The information collected in FIGS. 10A to 10C, 11A to 11C, and 12A to 12C may be input to at least one learning model for generating a map. The moving device 1 may obtain map data output from the learning model, by continuously inputting information collected while traveling in a task space, to the learning model for generating a map. The learning model may include, for example, a learning model for generating an aboveground map, a learning model for generating an underground map, and a learning model for generating an aboveground map and an underground map. The learning model may be managed by at least one of the moving device 1 or a server.

Figure 13B:
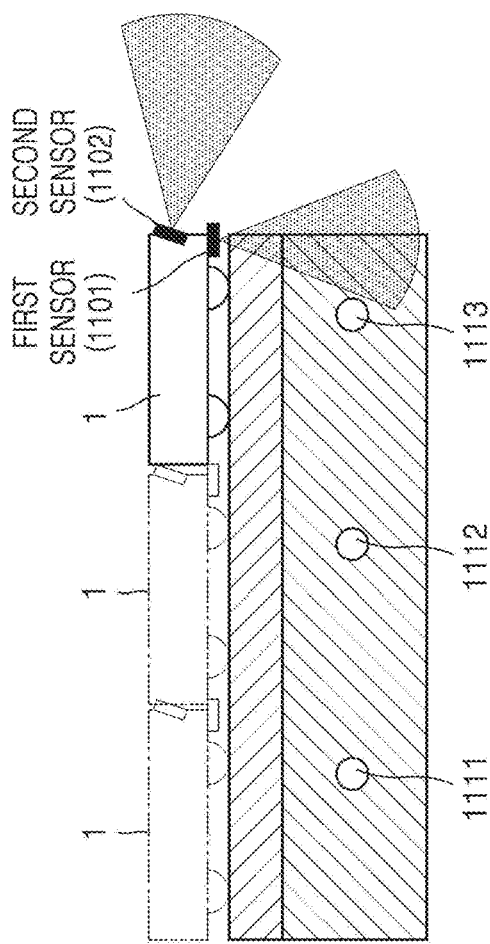
FIGS. 13A, 13B and 13C are diagrams for describing an underground reflected signal history according to various embodiments of the disclosure.
Figure 13A:
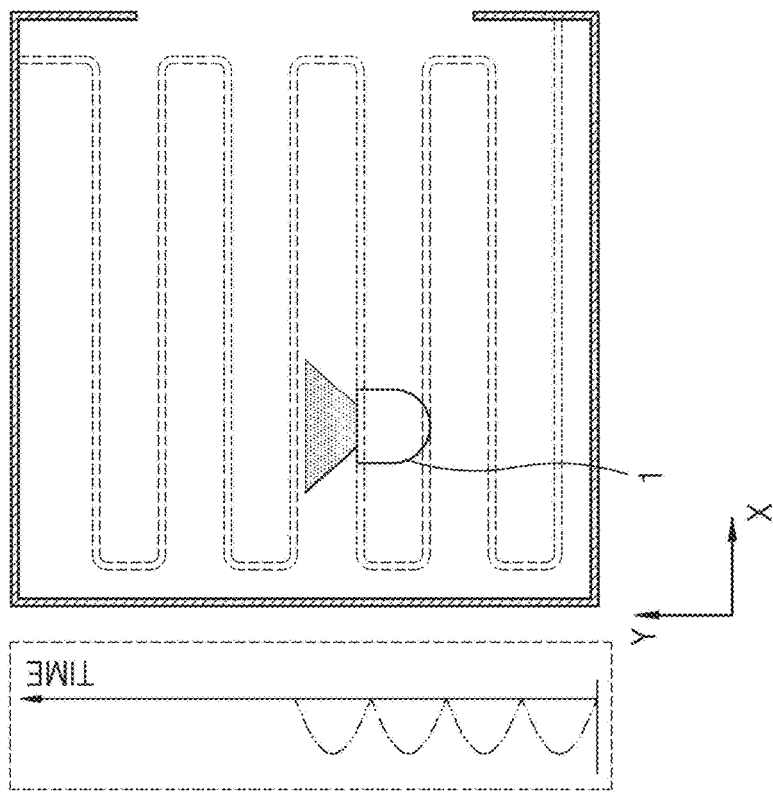
Figure 13C:
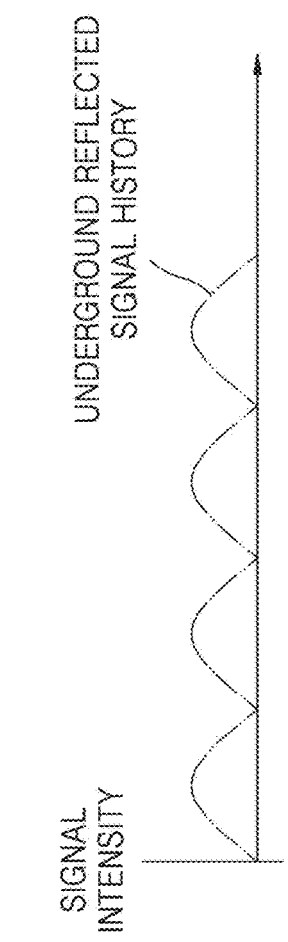

FIGS. 13A to 13C are diagrams for describing an underground reflected signal history according to an embodiment of the disclosure.

Referring to FIGS. 13A to 13C, the moving device 1 may travel and detect underground objects 1111, 1112, and 1113 by using at least one of a first RF sensor 1101 or a second RF sensor 1102.

For example, as time passes, the moving device 1 may travel in a Y direction as illustrated in FIG. 13A. In this case, as illustrated in FIG. 13B, the first RF sensor 1101 of the moving device 1 may sequentially detect the underground objects 1111, 1112, and 1113. For example, the first RF sensor 1101 of the moving device 1 may detect the underground object 1111, detect the underground object 1112 after a certain time, and detect the underground object 1113 after another certain time. As such, as time passes, the moving device 1 may generate an underground reflected signal history as illustrated in FIG. 13C.

The moving device 1 may correct an underground reflected signal reflected from an underground object located in a region to be traveled by the moving device 1, by using the underground reflected signal history. That is, when an underground reflected signal having a signal level much higher than an average level is detected, the moving device 1 may re-detect the underground object or correct the high signal level to the average level.

Alternatively, the moving device 1 may predict a current location of the moving device 1 by using the underground reflected signal history. For example, when the underground reflected signal history is generated and then a task is performed, the moving device 1 may predict the current location of the moving device 1 considering, for example, a number of times that an underground reflected signal is detected, and a travel speed.

Otherwise, the moving device 1 may correct a map of a region of interest where a task is performed, by using the underground reflected signal history. For example, the moving device 1 may correct a map of a region of interest (e.g., an aboveground map or a feature map) by using an underground object corresponding to periodical underground reflected signals, as a landmark.

Alternatively, the moving device 1 may predict an underground object of a region where the moving device 1 has not traveled, by using the underground reflected signal history. For example, when an underground reflected signal is periodically repeated, the moving device 1 may predict a next underground reflected signal by using a detection time or distance of a previous underground reflected signal. In this case, the moving device 1 may predict an underground object corresponding to the predicted underground reflected signal.

Figure 14:
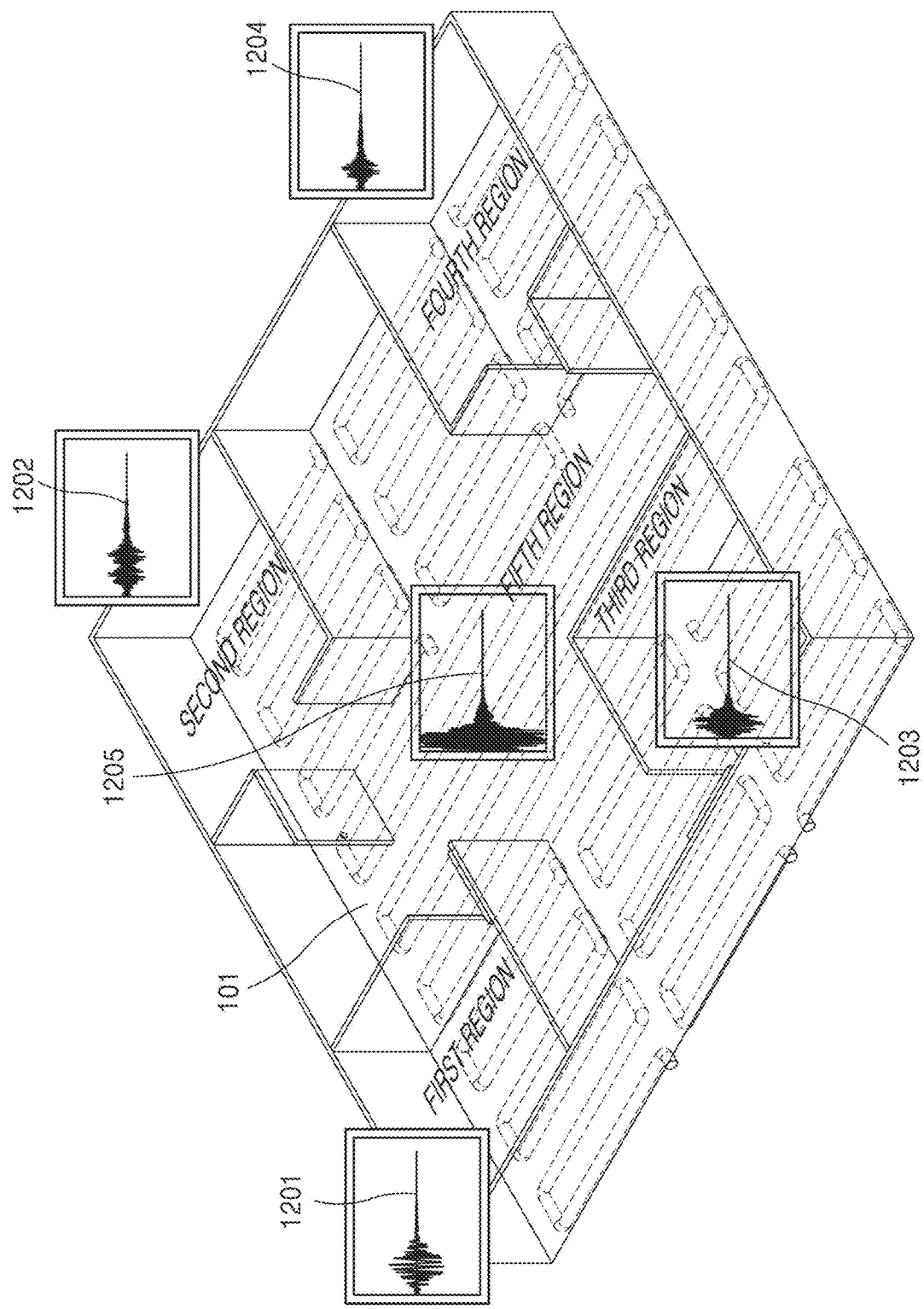
FIG. 14 is a diagram for describing underground reflected signals of different regions, according to an embodiment of the disclosure.

FIG. 14 is a diagram for describing underground reflected signals of different regions, according to an embodiment of the disclosure.

Referring to FIG. 14, a plurality of underground maps may be generated using underground reflected signals detected in different regions of the region of interest 101 of the moving device 1. The underground reflected signal may be generated by removing an aboveground reflected signal from a reflected signal. Otherwise, the underground reflected signal may be generated by extracting the underground reflected signal from the reflected signal. Alternatively, the underground reflected signal may be generated by radiating a sensing signal toward only an underground object.

For example, when the region of interest 101 where the moving device 1 performs a task is divided into a plurality of sub-regions, the moving device 1 may generate a plurality of underground maps of the plurality of divided sub-regions.

In this case, because underground objects of the plurality of sub-regions are different in type and shape, underground reflected signals having different intensities (e.g., different peak levels) may be detected in the plurality of sub-regions. For example, in FIG. 14, an underground reflected signal 1201 detected in a first region, an underground reflected signal 1202 detected in a second region, an underground reflected signal 1203 detected in a third region, an underground reflected signal 1204 detected in a fourth region, and an underground reflected signal 1205 detected in a fifth region may be different from each other.

In this case, per sub-region, the moving device 1 may generate and store a sub-underground map including distribution information of underground reflected signals. In this case, when a task is performed per sub-region, the moving device 1 may extract only a sub-underground map corresponding to a region where the task is being performed, and determine characteristics of an aboveground object by using the extracted sub-underground map.

According to various embodiments of the disclosure, an integrated underground map may be generated by combining at least some of the plurality of sub-underground maps. For example, one integrated underground map may be generated by combining underground maps of sub-regions having similar underground reflected signal histories.

Figure 15:
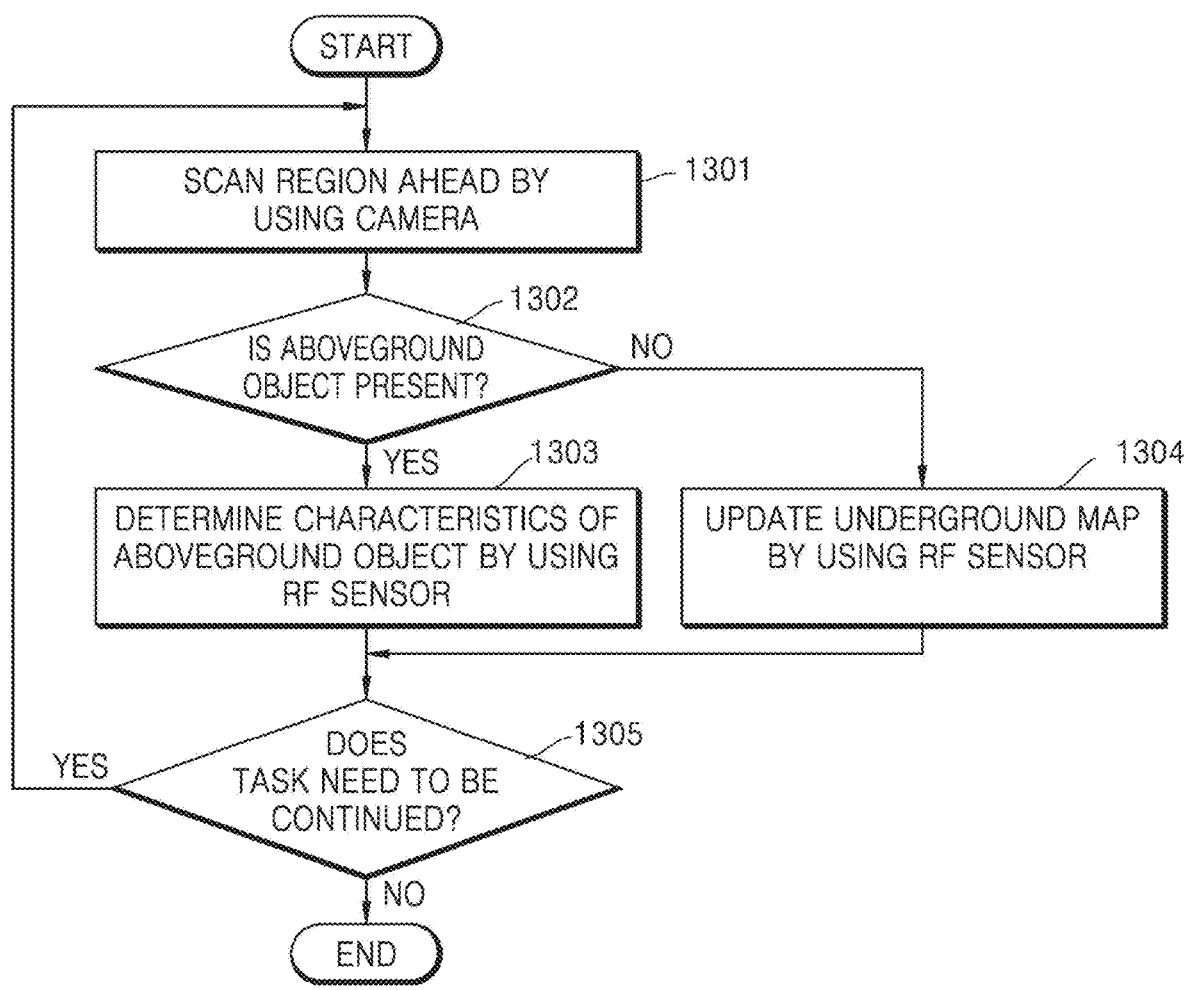
FIG. 15 is a flowchart for describing operations of a moving device, according to an embodiment of the disclosure.

FIG. 15 is a flowchart for describing operations of a moving device, according to an embodiment of the disclosure.

Referring to FIG. 15, the moving device 1 may scan a region ahead by using the camera 213 (1301).

As a result of scanning the region ahead, the moving device 1 may determine whether an aboveground object is present (1302).

Upon determining that the aboveground object is present (1302-YES), the moving device 1 may determine characteristics of the aboveground object by using an RF sensor (1303). For example, the moving device 1 may obtain a signal reflected from an aboveground object and an underground object. The moving device 1 may obtain an aboveground reflected signal by removing, from the reflected signal, an underground reflected signal corresponding to a location of the moving device 1. The moving device 1 may determine a distance to or a medium of the aboveground object, based on the obtained aboveground reflected signal. As such, the moving device 1 may identify whether the recognized aboveground object is an obstruction, e.g., a wall, furniture, or a home appliance, or a task target, e.g., a waste or a pollutant.

Otherwise, upon determining that the aboveground object is not present (1302-NO), the moving device 1 may update an underground map by using the RF sensor (1304). For example, the moving device 1 may update a previously stored underground map by using an underground reflected signal reflected from an underground object.

Then, the moving device 1 may determine whether to continue a task (e.g., a cleaning task) (1305). Upon determining to continue the task (1305-YES), the moving device 1 may continuously scan a region ahead by using the camera 213.

Figure 16:
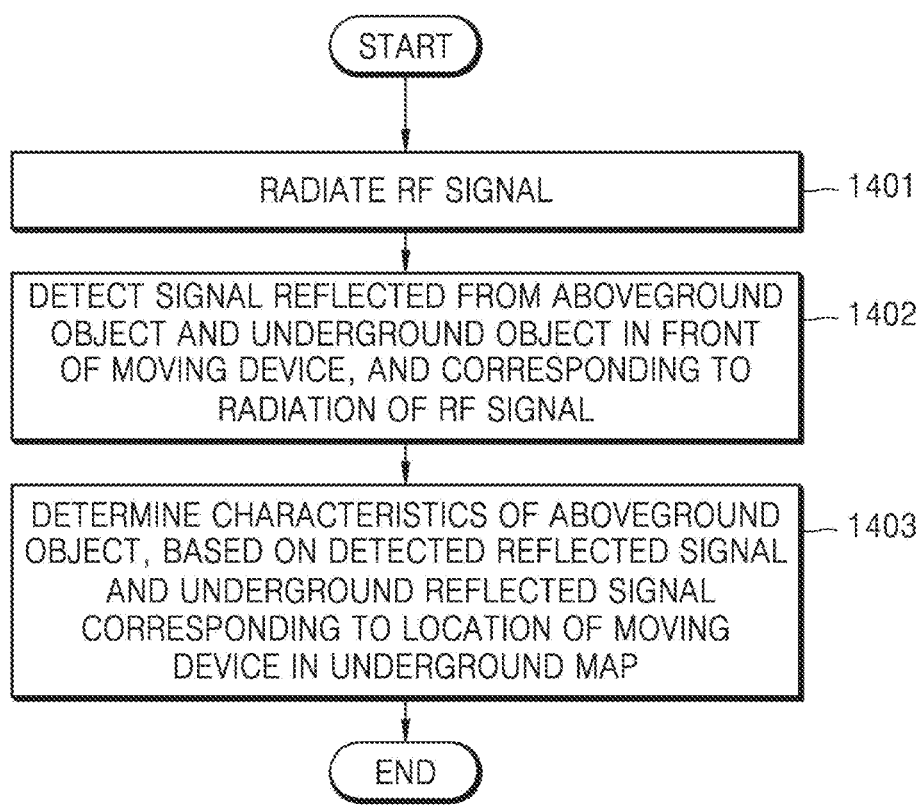
FIG. 16 is a flowchart for describing operations of a moving device, according to an embodiment of the disclosure.

FIG. 16 is a flowchart for describing operations of a moving device, according to an embodiment of the disclosure.

Referring to FIG. 16, the moving device 1 may radiate an RF signal (1401).

The moving device 1 may detect a signal reflected from an aboveground object and an underground object in front of the moving device 1, and corresponding to the radiation of the RF signal (1402).

When the reflected signal is detected, the moving device 1 may determine characteristics of the aboveground object, based on the detected reflected signal and an underground reflected signal corresponding to a location of the moving device 1 in an underground map (1403). In this case, the underground map may include distribution information of underground reflected signals, and be stored in the memory 240 of the moving device 1 or in a memory (not shown) of an external server (not shown).

According to various embodiments of the disclosure, when the characteristics of the aboveground object are determined, the moving device 1 may obtain an aboveground reflected signal corrected from the reflected signal, by removing at least a part of the underground reflected signal from the detected reflected signal. The moving device 1 may determine the characteristics of the aboveground object, based on the obtained aboveground reflected signal.

According to various embodiments of the disclosure, when the characteristics of the aboveground object are determined, the moving device 1 may obtain an aboveground reflected signal corrected from the reflected signal, by removing at least parts of the underground reflected signal and a noise signal from the detected reflected signal. The moving device 1 may determine the characteristics of the aboveground object, based on the obtained aboveground reflected signal.

According to various embodiments of the disclosure, the moving device 1 may radiate an RF signal. The moving device 1 may detect an underground reflected signal reflected from at least one underground object in front of or under the moving device 1, and corresponding to the radiation of the RF signal. The moving device 1 may generate an underground map based on the detected underground reflected signal, and a location of the moving device 1 at a time when the underground reflected signal is detected.

According to various embodiments of the disclosure, the moving device 1 may correct a map of a region where the moving device 1 performs a task, by using an underground object estimated based on underground reflected signals, as a landmark.

According to various embodiments of the disclosure, to generate the underground map, the moving device 1 may provide guide information for requesting to remove the aboveground object.

Figure 17:
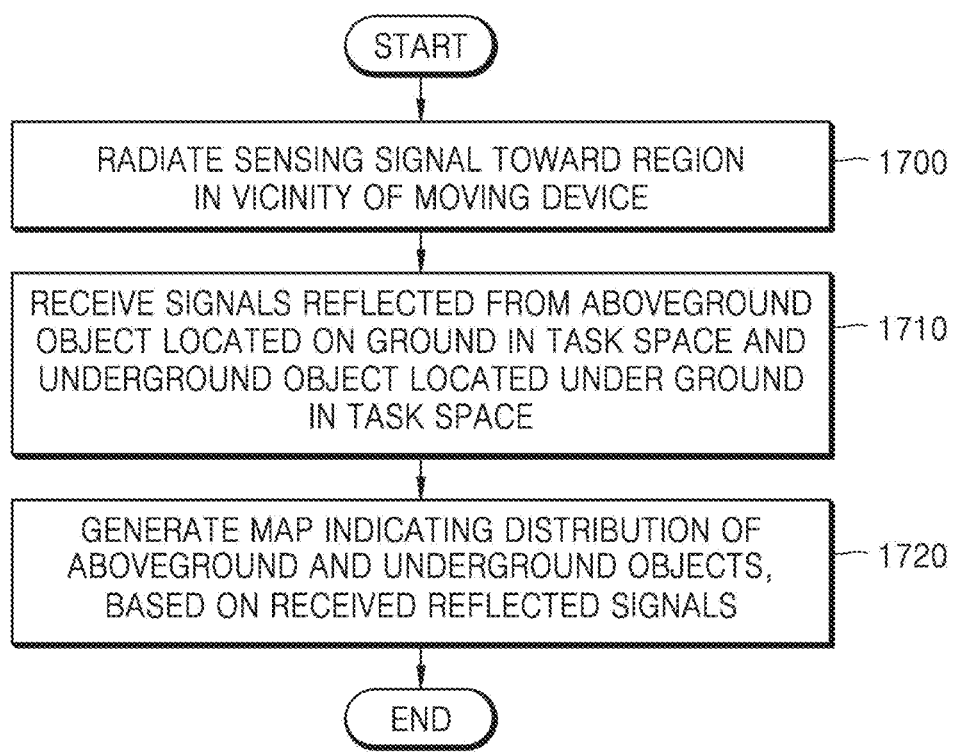
FIG. 17 is a flowchart of a method, performed by a moving device, of generating a map of a task space, according to an embodiment of the disclosure.

FIG. 17 is a flowchart of a method, performed by a moving device, of generating a map of a task space, according to an embodiment of the disclosure.

Referring to FIG. 17, in operation 1700, the moving device 1 may radiate a sensing signal toward a region in the vicinity of the moving device 1. The moving device 1 may radiate the sensing signal to in a forward direction or a downward direction of the moving device 1 while moving in a task space. The moving device 1 may radiate a plurality of sensing signals toward the region in the vicinity of the moving device 1. The moving device 1 may simultaneously or sequentially radiate a plurality of sensing signals having a plurality of frequencies. Alternatively, the moving device 1 may sequentially radiate a plurality of sensing signals having one frequency. The sensing signal radiated by the moving device 1 may be, for example, an RF signal.

In operation 1710, the moving device 1 may receive signals reflected from an aboveground object and an underground object. The sensing signal radiated by the moving device 1 may be reflected from each of the aboveground and underground objects, and the moving device 1 may receive an aboveground reflected signal reflected from the aboveground object and an underground reflected signal reflected from the underground object together. In operation 1710, the moving device 1 may not distinguish between the aboveground reflected signal and the underground reflected signal.

In operation 1720, the moving device 1 may generate a map indicating distribution of aboveground and underground objects, based on the received reflected signals. The moving device 1 may distinguish between the aboveground reflected signal and the underground reflected signal in the received reflected signals by analyzing the received reflected signals. The moving device 1 may determine characteristics of the aboveground object and characteristics of the underground object by analyzing the received reflected signals. The moving device 1 may determine a location of the aboveground object and a location of the underground object, based on a location of the moving device 1 and the received reflected signals. As such, the moving device 1 may generate the map including structure information indicating an aboveground structure of the task region, aboveground distribution information indicating distribution of the aboveground object located on the ground in the task region, and underground distribution information indicating distribution of the underground object located under the ground in the task region.

The moving device 1 may generate a 3D map of the task space by using a captured image of the task space. In this case, the moving device 1 may identify the size and a shape of the aboveground object by using the captured image of the task space. The moving device 1 may identify a location and an area of a part of the aboveground object in contact with the floor. The moving device 1 may identify a height of a part of a bottom surface of the aboveground object not in contact with the floor of the task space. For example, when the aboveground object is a table, the moving device 1 may identify the size of the table, locations of legs of the table, an area of parts of the legs of the table in contact with the floor of the task space, and a height of a bottom surface of the table. The moving device 1 may include 3D information indicating the size and the shape of the aboveground object, in aboveground information of the map of the task space.

The moving device 1 may include 3D information indicating the size, a shape, and a depth of the underground object, in underground information of the map of the task space by using depth information of the underground object of the task space.

For example, the moving device 1 may input information about a captured image of the region in the vicinity of the moving device 1, a capturing timing, the location of the moving device 1, the received reflected signals, and reception timings of the reflected signals to a learning model for generating a map, and thus obtain a map output from the learning model.

Figure 18:
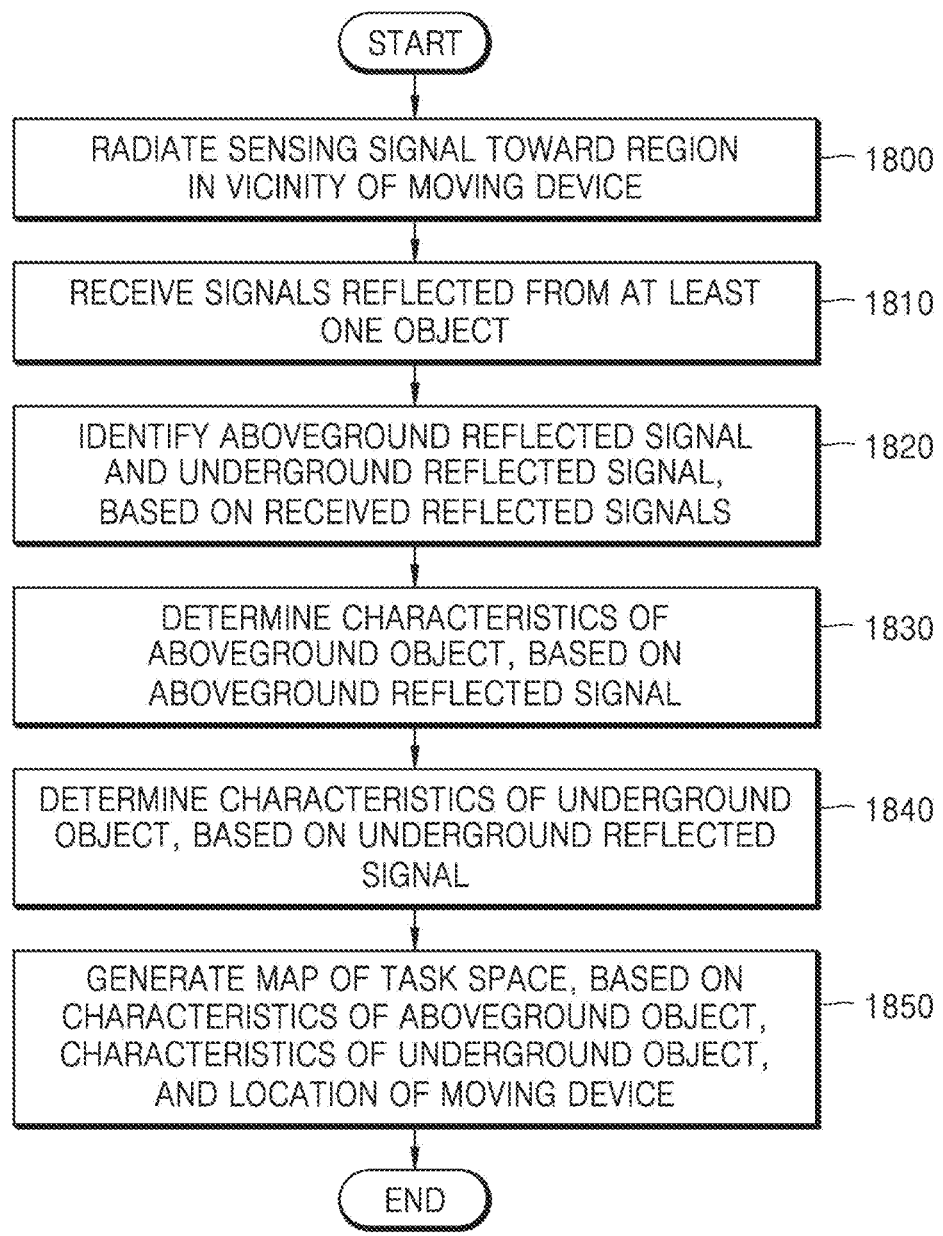
FIG. 18 is a detailed flowchart of a method, performed by a moving device, of generating a map of a task space, according to an embodiment of the disclosure.

FIG. 18 is a detailed flowchart of a method, performed by a moving device, of generating a map of a task space, according to an embodiment of the disclosure.

The moving device 1 may radiate a sensing signal toward a region in the vicinity of the moving device 1 in operation 1800, and receive signals reflected from at least one object in operation 1810. The moving device 1 may sequentially radiate a plurality of sensing signals while moving in a task space, and sequentially receive signals reflected from the at least one object.

Referring to FIG. 18, in operation 1820, the moving device 1 may identify an aboveground reflected signal and an underground reflected signal, based on the received reflected signals. The moving device 1 may sequentially radiate the plurality of sensing signals while moving in the task space, and calculate distance values between the moving device 1 and an object at times when the sensing signals are radiated. The moving device 1 may calculate variations of the distance values between the moving device 1 and the object. The moving device 1 may identify whether the object is an aboveground object or an underground object, considering the variations of the distance values between the moving device 1 and the object. For example, the moving device 1 may identify whether the object is an aboveground object or an underground object, considering a speed of the moving device 1, an acceleration of the moving device 1, and the variations of the distance values to the object. For example, when the moving device 1 radiates a plurality of sensing signals while moving at a uniform speed and when the distance value to the object varies equally or similarly to a travel distance of the moving device 1 by a certain value or above, the object may be determined as an aboveground object. For example, when the moving device 1 radiates a plurality of sensing signals while moving at a uniform speed and when the distance value to the object varies differently from a travel distance of the moving device 1 by a certain value or above, the object may be determined as an underground object.

The moving device 1 may perform operation 1820 by using a learning model for identifying a signal. In this case, the moving device 1 may identify the aboveground reflected signal and the underground reflected signal by inputting the received reflected signals to the learning model for identifying a signal. The learning model for identifying a signal may be constructed considering, for example, an application field of the learning model, a purpose of learning, or computing performance of a device. The learning model for identifying a signal may be, for example, a model based on a neural network. For example, the learning model for identifying a signal may use a DNN model, an RNN model, or a BRDNN model, but is not limited thereto.

FIG. 20 includes graphs respectively showing data about signal attenuation through materials and signal attenuation in the atmosphere, according to an embodiment of the disclosure.

Referring to FIG. 18, in operation 1830, the moving device 1 may determine characteristics of the aboveground object, based on the aboveground reflected signal. The moving device 1 may determine the characteristics of the aboveground object, based on signal attenuation of the aboveground reflected signal. The moving device 1 may determine the characteristics of the aboveground object, based on, for example, data about signal attenuation through materials and signal attenuation in the atmosphere. In this case, the moving device 1 may determine the characteristics of the aboveground object considering a frequency of the radiated sensing signal. When the moving device 1 radiates sensing signals of a plurality of frequencies, the characteristics of the aboveground object may be determined considering attenuation of the reflected signal per frequency. To effectively determine the characteristics of the aboveground object, the moving device 1 may radiate sensing signals of various frequencies. To effectively determine the characteristics of the aboveground object, the moving device 1 may perform long-range sensing and short-range sensing by using the sensing signals of various frequencies.

In operation 1840, the moving device 1 may determine characteristics of the underground object, based on the underground reflected signal. The moving device 1 may determine the characteristics of the underground object, based on signal attenuation of the underground reflected signal. The moving device 1 may determine the characteristics of the underground object, based on, for example, data about signal attenuation through materials and signal attenuation in the atmosphere as illustrated in FIG. 20. In this case, the moving device 1 may determine the characteristics of the underground object considering a frequency of the radiated sensing signal. When the moving device 1 radiates sensing signals of a plurality of frequencies, the characteristics of the underground object may be determined considering attenuation of the reflected signal per frequency. To determine the characteristics of the underground object, the moving device 1 may use medium characteristics of the floor. In this case, the medium characteristics of the floor may be previously determined by the moving device 1 and stored in the memory 240, but are not limited thereto. The moving device 1 may separately identify the medium characteristics of the floor. To effectively determine the characteristics of the underground object, the moving device 1 may radiate sensing signals of various frequencies. To effectively determine the characteristics of the underground object, the moving device 1 may perform long-range sensing and short-range sensing by using the sensing signals of various frequencies.

The moving device 1 may perform operations 1830 and 1840 by using a learning model for identifying object characteristics. In this case, the moving device 1 may identify object characteristics by inputting at least one of the aboveground reflected signal or the underground reflected signal to the learning model for identifying object characteristics. The learning model for identifying object characteristics may be constructed considering, for example, an application field of the learning model, a purpose of learning, or computing performance of a device. The learning model for identifying object characteristics may be, for example, a model based on a neural network. For example, the learning model for identifying object characteristics may use a DNN model, an RNN model, or a BRDNN model, but is not limited thereto.

In operation 1850, the moving device 1 may generate a map of the task space, based on the characteristics of the aboveground object, the characteristics of the underground object, and a location of the moving device 1. The moving device 1 may determine a location of the aboveground object and a location of the underground object, based on the location of the moving device 1, a radiation direction of the sensing signal, a distance between the moving device 1 and the aboveground object, and a distance between the moving device 1 and the underground object. The moving device 1 may generate the map of the task space, based on the location of the aboveground object, the location of the underground object, the characteristics of the aboveground object, and the characteristics of the underground object. The moving device 1 may generate, for example, a structure map indicating an aboveground structure of the task region, an aboveground map indicating distribution of the aboveground object, and an underground map indicating distribution of the underground object. Alternatively, the moving device 1 may generate an integrated map of at least two of, for example, the structure map indicating an aboveground structure of the task region, the aboveground map indicating distribution of the aboveground object, and the underground map indicating distribution of the underground object.

The moving device 1 may receive, from a server (not shown), underground information about underground objects located under the ground in the task space, and correct the characteristics and the location of the underground object by using the received underground information. In this case, the underground information may include, for example, pipe information about pipes buried under the ground in the task space, and rebar information about rebars buried under the ground in the task space, but is not limited thereto. For example, the underground information may be generated based on a blueprint used to construct the task space and be stored in the server.

The moving device 1 may perform operation 1850 by using a learning model for generating a map. In this case, the moving device 1 may generate the map by inputting at least some of the received reflected signals, the aboveground reflected signal, the underground reflected signal, the object characteristics values, and the underground information to the learning model. The learning model for generating a map may be constructed considering, for example, an application field of the learning model, a purpose of learning, or computing performance of a device. The learning model for generating a map may be, for example, a model based on a neural network. For example, the learning model for generating a map may use a DNN model, an RNN model, or a BRDNN model, but is not limited thereto.

The moving device 1 may perform operations 1820 to 1850 may using one learning model for generating a map.

Figure 19:
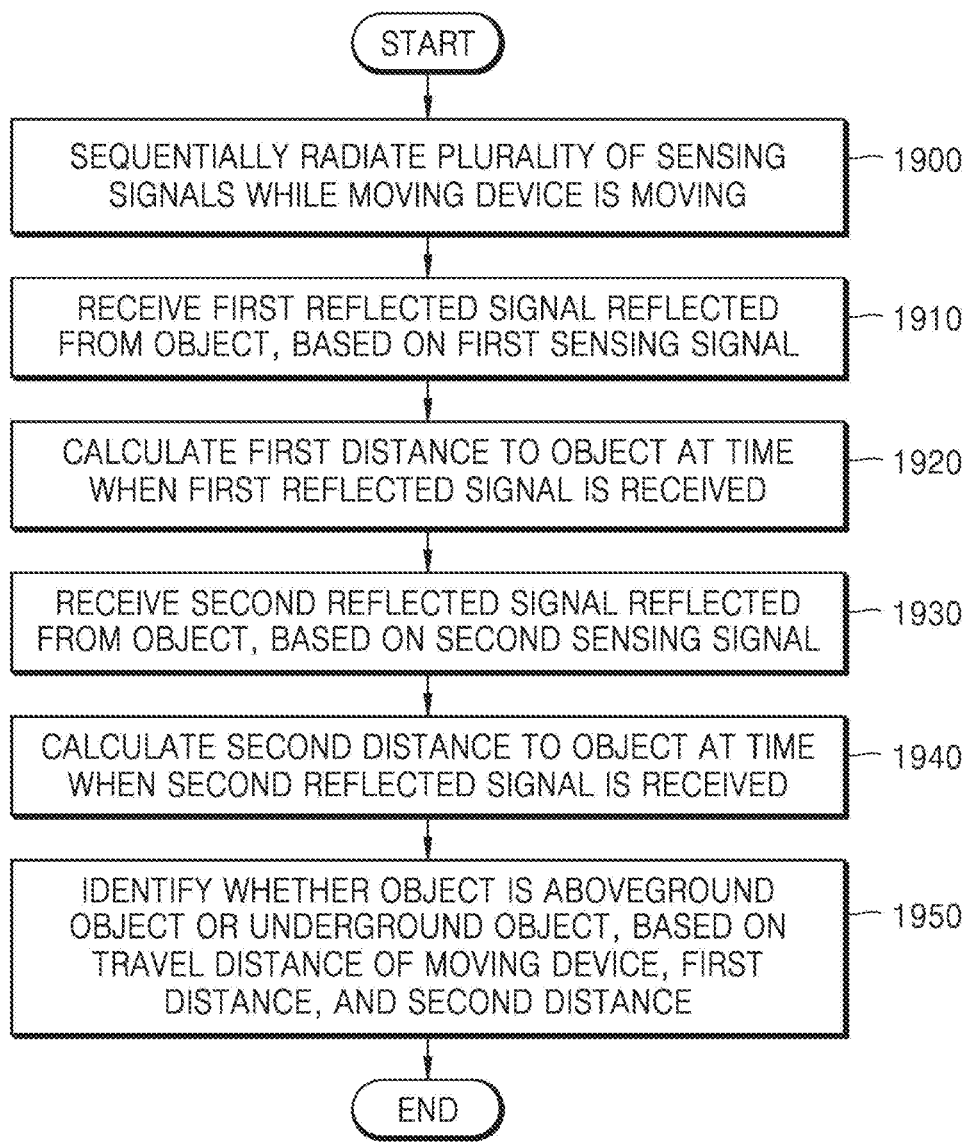
FIG. 19 is a flowchart of a method, performed by a moving device, of identifying an aboveground object and an underground object, according to an embodiment of the disclosure.

FIG. 19 is a flowchart of a method, performed by a moving device, of identifying an aboveground object and an underground object, according to an embodiment of the disclosure.

In operation 1900, the moving device 1 may sequentially radiate a plurality of sensing signals while moving in a task space. The moving device 1 may sequentially radiate a first sensing signal and a second sensing signal at a certain time interval while moving in the task space. The moving device 1 may identify locations of the moving device 1 at times when the plurality of sensing signals are radiated, while radiating the plurality of sensing signals.

The moving device 1 may receive a first reflected signal reflected from an object, based on the first sensing signal in operation 1910, and calculate a first distance to the object at a time when the first reflected signal is received, in operation 1920. The moving device 1 may calculate the first distance to the object, based on signal characteristics of the first sensing signal, a timing when the first sensing signal is radiated, and a timing when the first reflected signal is received. The moving device 1 may calculate the first distance to the object, based on a speed of the first sensing signal and a time difference between the timing when the first sensing signal is radiated and the timing when the first reflected signal is received. The time when the first reflected signal is received may refer to any one timing when the moving device 1 radiates the first sensing signal and receives the first reflected signal.

The moving device 1 may receive a second reflected signal reflected from the object, based on the second sensing signal in operation 1930, and calculate a second distance to the object at a time when the second reflected signal is received, in operation 1940. The moving device 1 may calculate the second distance to the object, based on signal characteristics of the second sensing signal, a timing when the second sensing signal is radiated, and a timing when the second reflected signal is received. The moving device 1 may calculate the second distance to the object, based on a speed of the second sensing signal and a time difference between the timing when the second sensing signal is radiated and the timing when the second reflected signal is received. The time when the second reflected signal is received may refer to any one timing when the moving device 1 radiates the second sensing signal and receives the second reflected signal.

Referring to FIG. 19, in operation 1950, the moving device 1 may identify whether the object is an aboveground object or an underground object, based on the first distance, the second distance, and a travel distance of the moving device 1. The moving device 1 may calculate the travel distance of the moving device 1, based on a speed of the moving device 1, the timing when the first reflected signal is received, and the timing when the second reflected signal is received. The moving device 1 may identify whether the object is an aboveground object or an underground object, by comparing a distance variation between the first and second distances with the calculated travel distance.

Although the moving device 1 radiates the first sensing signal and the second sensing signal in FIG. 19 for convenience of explanation, the moving device 1 is not limited thereto. The moving device 1 may sequentially radiate three or more sensing signals while moving, and identify whether the object is an aboveground object or an underground object, by analyzing signals reflected based on the radiated sensing signals.

Figure 21:
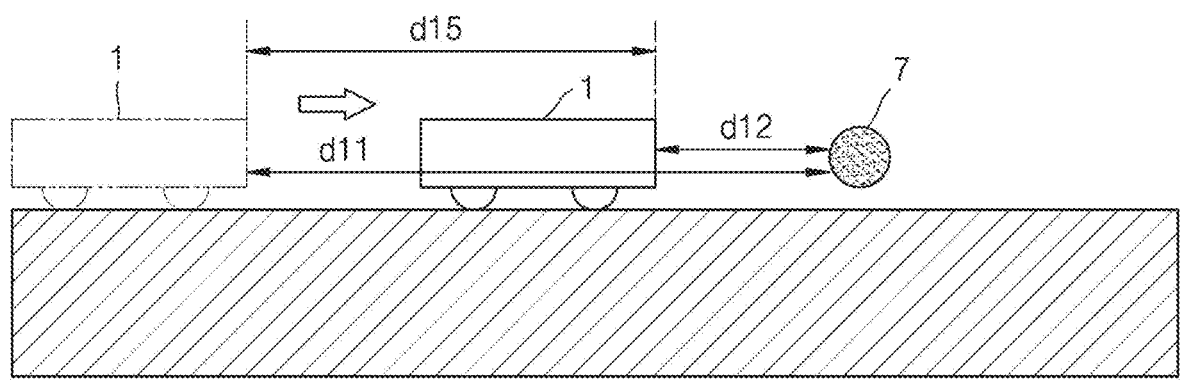
FIG. 21 is a diagram for describing an example of a method, performed by a moving device, of identifying an aboveground object and an underground object according to an embodiment of the disclosure.

FIG. 21 is a diagram for describing an example of a method, performed by a moving device, of identifying an aboveground object and an underground object according to an embodiment of the disclosure.

Figure 22:
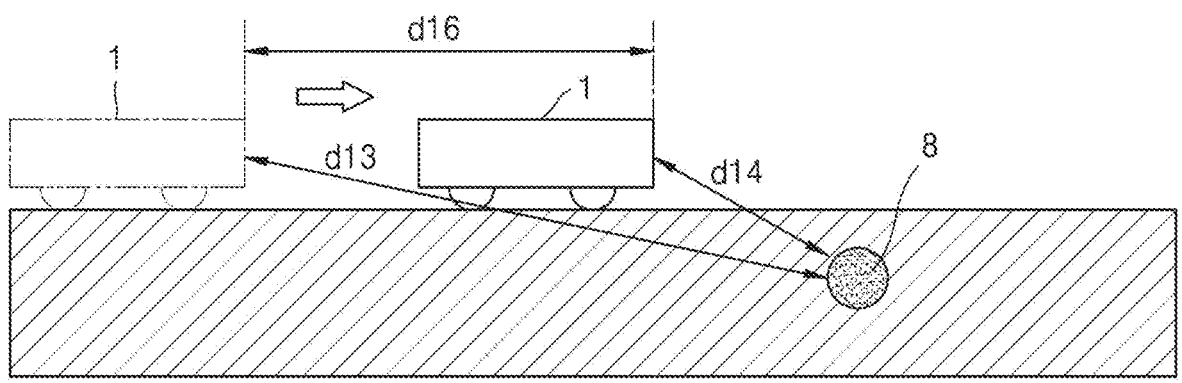
FIG. 22 is a diagram for describing an example of a method, performed by a moving device, of identifying an aboveground object and an underground object according to an embodiment of the disclosure.

FIG. 22 is a diagram for describing an example of a method, performed by a moving device, of identifying an aboveground object and an underground object according to an embodiment of the disclosure.

Referring to FIG. 21, the moving device 1 may radiate a first sensing signal toward an aboveground object 7 while moving in a task space, and receive a first reflected signal reflected from the aboveground object 7. The moving device 1 may calculate a first distance d11 between the moving device 1 and the aboveground object 7, based on a speed of the first sensing signal, a timing when the first sensing signal is radiated, and a timing when the first reflected signal is received.

Then, the moving device 1 may radiate a second sensing signal toward the aboveground object 7 while moving in the task space, and receive a second reflected signal reflected from the aboveground object 7. The moving device 1 may calculate a second distance d12 between the moving device 1 and the aboveground object 7, based on a speed of the second sensing signal, a timing when the second sensing signal is radiated, and a timing when the second reflected signal is received.

The moving device 1 may calculate a travel distance d15 of the moving device 1 from when the first reflected signal is received until when the second reflected signal is received. The moving device 1 may calculate the travel distance d15, based on a location of the moving device 1 at a time when the first reflected signal is received and a location of the moving device 1 at a time when the second reflected signal is received.

Then, the moving device 1 may identify that the aboveground object 7 is an object located on the ground, by comparing a difference d12-d11 between the second distance d12 and the first distance d11 with the travel distance d15. For example, when the difference d12-d11 between the second distance d12 and the first distance d11 is substantially equal to the travel distance d15, the moving device 1 may identify that the aboveground object 7 is an object located on the ground.

Referring to FIG. 22, the moving device 1 may radiate a third sensing signal toward an underground object 8 while moving in the task space, and receive a third reflected signal reflected from the underground object 8. The moving device 1 may calculate a third distance d13 between the moving device 1 and the underground object 8, based on a speed of the third sensing signal, a timing when the third sensing signal is radiated, and a timing when the third reflected signal is received.

Then, the moving device 1 may radiate a fourth sensing signal toward the underground object 8 while moving in the task space, and receive a fourth reflected signal reflected from the underground object 8. The moving device 1 may calculate a fourth distance d14 between the moving device 1 and the underground object 8, based on a speed of the fourth sensing signal, a timing when the fourth sensing signal is radiated, and a timing when the fourth reflected signal is received.

Because the speed of the third sensing signal may slightly vary through an underground material under the floor, the third distance d13 calculated by the moving device 1 may slightly differ from an actual distance between the moving device 1 and the underground object 8. In addition, because the speed of the fourth sensing signal may slightly vary through the underground material under the floor, the fourth distance d14 calculated by the moving device 1 may slightly differ from an actual distance between the moving device 1 and the underground object 8.

The moving device 1 may calculate a travel distance d16 of the moving device 1 from when the third reflected signal is received until when the fourth reflected signal is received. The moving device 1 may calculate the travel distance d16, based on a location of the moving device 1 at a time when the third reflected signal is received and a location of the moving device 1 at a time when the fourth reflected signal is received.

Then, the moving device 1 may identify that the underground object 8 is an object located under the ground, by comparing a difference d14-d13 between the fourth distance d14 and the third distance d13 with the travel distance d16. For example, when the difference d14-d13 between the fourth distance d14 and the third distance d13 is substantially different from the travel distance d16 by a certain value or above, the moving device 1 may identify that the underground object 8 is an object located under the ground.

In the disclosure, to use a learning model, the processor 220 of the moving device 1 may include a data trainer (not shown) and a data recognizer (not shown). In this case, the data trainer may be trained with criteria for analyzing an object, generating a map, and performing a task. The data trainer may be trained with data used to analyze an object, generate a map, and perform a task, and criteria for analyzing an object, generating a map, and performing a task, by using the data. The data trainer may obtain data to be used for training, and be trained with criteria for analyzing an object, generating a map, and performing a task, by applying the obtained data to the learning model.

The data recognizer may analyze an object, generate a map, and perform a task based on data. The data recognizer may analyze an object, generate a map, and perform a task based on certain data by using the trained learning model. The data recognizer may obtain certain data according to a preset criterion based on training, and obtain an output value for analyzing an object, generating a map, and performing a task, from the learning model by inputting the obtained data to the learning model. The value output from the learning model may be used to update the learning model.

At least one of the data trainer or the data recognizer may be produced in the form of at least one hardware chip and be mounted in an electronic device. For example, at least one of the data trainer or the data recognizer may be produced in the form of a dedicated hardware chip for artificial intelligence (AI), or may be produced as a part of an existing general-purpose processor (e.g., a central processing unit (CPU) or an application processor) or a dedicated graphic processor (e.g., a graphic processing unit (GPU)) and be mounted in various electronic devices.

In this case, the data trainer or the data recognizer may be mounted in one electronic device or in different electronic devices. For example, one of the data trainer and the data recognizer may be mounted in an electronic device, and the other may be included in a server. The data trainer and the data recognizer may be connected in a wired or wireless manner, and thus model information constructed by the data trainer may be provided to the data recognizer and data input to the data recognizer may be provided to the data trainer as additional training data.

At least one of the data trainer or the data recognizer may be implemented as a software module. When at least one of the data trainer or the data recognizer is implemented as a software module (or a program module including instructions), the software module may be stored in non-transitory computer-readable media. In this case, at least one software module may be provided by an operating system (OS) or by a certain application. Alternatively, a part of at least one software module may be provided by an OS, and the other part may be provided by a certain application.

As used herein, the term "module" or "unit" may include a unit implemented using hardware, software, or firmware, and be used interchangeably with, for example, the term "logic", "logic block", "component", or "circuit. A module may be an integrated component, or the smallest unit of the component or a part thereof, which performs one or more functions. For example, according to an embodiment of the disclosure, a module may be implemented in the form of an application-specific integrated circuit (ASIC).

Various embodiments of the disclosure may be implemented as software (or a program) including one or more instructions stored in a storage medium (e.g., the memory 240 or external memory) readable by a machine (e.g., the moving device 1). For example, the machine (e.g., the moving device 1) may fetch at least one instruction from among the stored one or more instructions from the storage medium, and execute the same. This enables the machine to perform at least one function based on the at least one fetched instruction. The one or more instructions may include codes produced by a compiler, or codes executable by an interpreter. The storage medium readable by the machine may be provided in the form of a non-transitory storage medium. When a storage medium is 'non-transitory', it means that the storage medium is tangible and does not include signals (e.g., electromagnetic waves), and it does not limit that data is semi-permanently or temporarily stored in the storage medium.

According to an embodiment of the disclosure, the methods according to various embodiments of the disclosure may be included and provided in a computer program product. The computer program product may be traded between a seller and a buyer. The computer program product may be distributed in the form of a machine-readable storage medium (e.g., a compact disc-read only memory (CD-ROM)), or be distributed online (e.g., downloaded or uploaded) through an application store (e.g., Google Play™) or directly between two user devices (e.g., smartphones). When distributed online, at least a part of the computer program product may be at least temporarily stored or created in a machine-readable storage medium such as a server of a manufacturer, a server of an application store, or memory of a relay server.

According to the disclosure, when a moving device uses an RF sensor, characteristics of objects located on and under the ground in a task space may be predicted considering characteristics of signals measured using the RF sensor.

Furthermore, when the moving device uses the RF sensor, interference with other signals of narrow frequency bands may be minimized.

A corrected aboveground reflected signal may be obtained by removing at least a part of an underground reflected signal corresponding to an underground object in the task space, from a reflected signal detected by the moving device as a result of radiating an RF signal. As such, the characteristics of the object may be accurately predicted.

Alternatively, a corrected aboveground reflected signal may be obtained by removing at least a part of the underground reflected signal corresponding to the underground object, and a noise signal such as an interference signal, from the reflected signal detected by the moving device as a result of radiating the RF signal. As such, the characteristics of the object may be more accurately predicted.

When a dedicated RF sensor for detecting the underground object is included, accuracy of map information indicating the underground object may be increased and, particularly, the corrected aboveground reflected signal may be obtained while traveling, by omitting an initial operation mode for collecting the map information indicating the underground object.

Because a map of a region of interest where the moving device performs a task may be corrected using distribution information of underground reflected signals corresponding to the underground object, task performing capability of the moving device may be increased and an accurate map may be generated.

When the moving device predicts characteristics of the object, the moving device may travel in various ways considering the characteristics of the object. For example, considering the characteristics of the object, the moving device may bypass the object, go over the object, or perform a task (e.g., a cleaning task) on the object.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A moving device for generating a map related to an object, the moving device comprising:
a body;
a running unit configured to move the body;
a sensing circuitry configured to radiate sensing signals toward a region in a vicinity of the moving device;
a memory storing at least one instruction; and
a processor configured to execute the at least one instruction to:
control the sensing circuitry to radiate the sensing signals toward aboveground and underground regions in the vicinity of the moving device, and receive an aboveground reflected signal reflected from an aboveground object located on a ground in a task space of the moving device and an underground reflected signal reflected from an underground object located under the ground in the task space, and
generate a map indicating distribution of the aboveground object and distribution of the underground object, based on the aboveground reflected signal and the underground reflected signal,
wherein the processor is further configured to execute the at least one instruction to:
correct the aboveground reflected signal by removing a noise signal and an underground reflected signal previously stored in the memory, from the aboveground reflected signal and the underground reflected signal, and
determine characteristics of the aboveground object, based on the corrected aboveground reflected signal.

2. The moving device of claim 1, wherein the processor is further configured to execute the at least one instruction to:
control the sensing circuitry to sequentially radiate a plurality of sensing signals while the moving device is moving, and
distinguish between the aboveground reflected signal and the underground reflected signal, based on variations of distance values calculated using the signals reflected from the aboveground object and the underground object.

3. The moving device of claim 1, wherein the processor is further configured to execute the at least one instruction to determine characteristics of the aboveground object and the underground object, based on a frequency of the sensing signal, signal attenuation of the aboveground reflected signal, and signal attenuation of the underground reflected signal.

4. The moving device of claim 3, wherein the characteristics of the aboveground object comprise at least one of material information of the aboveground object or type information of the aboveground object.

5. The moving device of claim 1, wherein the processor is further configured to execute the at least one instruction to identify locations of the aboveground object and the underground object, based on distance values calculated using the signals reflected from the aboveground object and the underground object, and a location of the moving device.

6. The moving device of claim 1, wherein the processor is further configured to execute the at least one instruction to:
control the sensing circuitry to radiate a radio-frequency (RF) signal in a downward direction of the moving device, and receive the underground reflected signal reflected from the underground object,
identify a location of the moving device corresponding to a time when the RF signal is radiated, and
generate distribution information indicating distribution of the underground object located under the task space, based on the received underground reflected signal and the identified location.

7. The moving device of claim 1, wherein the processor is further configured to execute the at least one instruction to generate distribution information indicating distribution of the aboveground object in the task space, based on a location of the underground object identified based on the underground reflected signal.

8. The moving device of claim 1,
wherein the sensing circuitry comprises a first radio frequency (RF) sensor and a second RF sensor, and
wherein the first RF sensor is configured to detect the underground reflected signal and the second RF sensor configured to detect the aboveground reflected signal are mounted at different locations to radiate RF signals in different directions.

9. A method, performed by a moving device, of generating a map related to an object, the method comprising:
- radiating sensing signals toward aboveground and underground regions in a vicinity of the moving device;
- receiving an aboveground reflected signal reflected from an aboveground object located on a ground in a task space of the moving device and an underground reflected signal reflected from an underground object located under the ground in the task space;
- generating a map indicating distribution of the aboveground object and distribution of the underground object, based on the aboveground reflected signal and the underground reflected signal;
- correcting the aboveground reflected signal by removing a noise signal and an underground reflected signal previously stored in a memory, from the aboveground reflected signal and the underground reflected signal; and
- determining characteristics of the aboveground object, based on the corrected aboveground reflected signal.

10. The method of claim 9,
- wherein the radiating of the sensing signals comprises sequentially radiating a plurality of sensing signals while the moving device is moving, and
- wherein the method further comprises distinguishing between the aboveground reflected signal and the underground reflected signal, based on variations of distance values calculated using the signals reflected from the aboveground object and the underground object.

11. The method of claim 9, further comprising determining characteristics of the aboveground object and the underground object, based on a frequency of the sensing signal, signal attenuation of the aboveground reflected signal, and signal attenuation of the underground reflected signal.

12. The method of claim 9, further comprising identifying locations of the aboveground object and the underground object, based on distance values calculated using the signals reflected from the aboveground object and the underground object, and a location of the moving device.

13. The method of claim 9,
- wherein the receiving comprises receiving the underground reflected signal reflected from the underground object, based on a radio-frequency (RF) signal radiated in a downward direction of the moving device, and
- wherein the generating of the map comprises identifying a location of the moving device corresponding to a time when the RF signal is radiated, and generating distribution information indicating distribution of the underground object located under the task space, based on the received underground reflected signal and the identified location.

14. The method of claim 9, wherein the radiating of the at least one sensing signal comprises radiating the sensing signal toward each of the aboveground and underground regions by using a plurality of radio frequency (RF) sensors mounted at different locations on the moving device.

15. A computer program product comprising a non-transitory computer-readable recording medium having stored therein a program configured to, when executed, cause at least one computer processor to control to:
- radiate sensing signals toward aboveground and underground regions in a vicinity of a moving device;
- receive an aboveground reflected signal reflected from an aboveground object located on a ground in a task space of the moving device and an underground reflected signal reflected from an underground object located under the ground in the task space;
- generate a map indicating distribution of the aboveground object and distribution of the underground object, based on the aboveground reflected signal and the underground reflected signal;
- correct the aboveground reflected signal by removing a noise signal and an underground reflected signal previously stored in a memory, from the aboveground reflected signal and the underground reflected signal; and
- determine characteristics of the aboveground object, based on the corrected aboveground reflected signal.

* * * * *